Fig-2
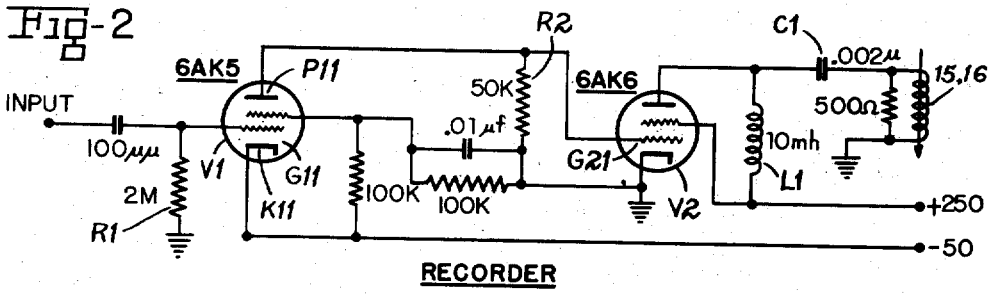
Fig-1
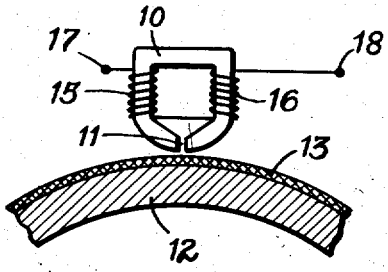
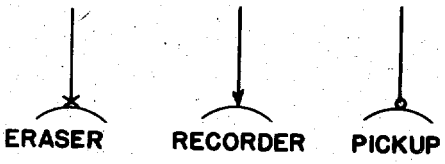
Fig-3
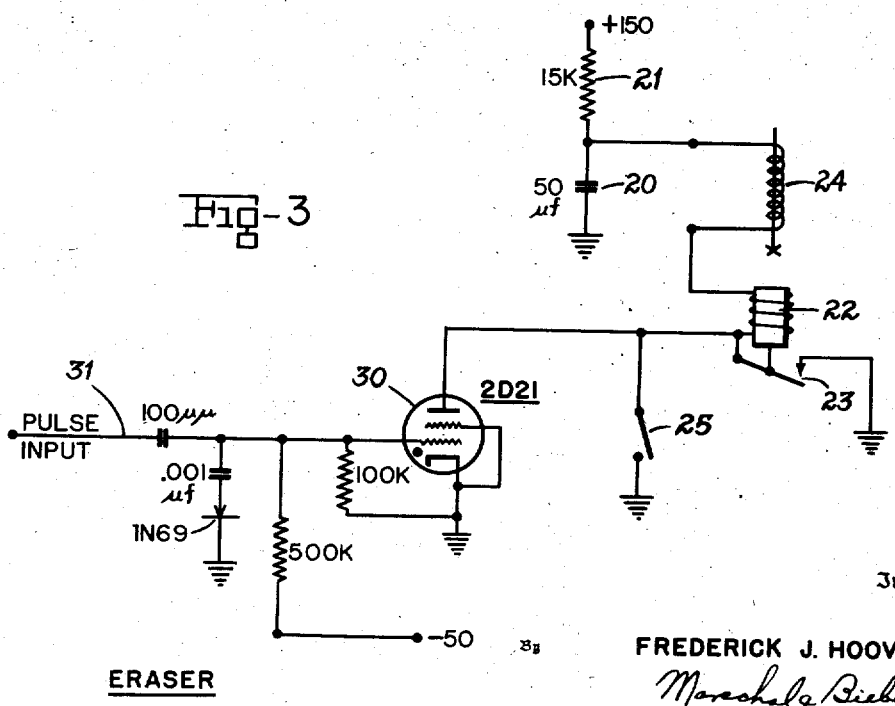
Inventor
FREDERICK J. HOOVEN
Marechale & Biebel
Attorneys Inventor By FREDERICK J. HOOVEN Marechal & Biebel Attorneys

ECCLES-JORDAN TRIGGER CIRCUIT (FLIP-FLOP)

Inventor

By

FREDERICK J. HOOVEN

Marechale Bubel

Attorneys

PHOTOTYPESETTING

Original Filed Jan. 11, 1951 16 Sheets-Sheet 5

Inventor

FREDERICK J. HOOVEN

By Marechale & Biebel

Attorneys

FLASHING LIGHT CONTROL

STEP CONTROL

Inventor
FREDERICK J. HOOVEN
Marshall & Biebel
Attorneys

Inventor
FREDERICK J. HOOVEN
By
Marechale & Biebel
Attorneys

Inventor
FREDERICK J. HOOVEN
Marechal & Biebel
Attorneys

Inventor
FREDERICK J. HOOVEN
By
Marechal & Biebel
Attorneys

Inventor

FREDERICK J. HOOVEN

By Marechal & Biebel

Attorneys

Inventor

FREDERICK J. HOOVEN

By

Marechal & Biebel

Attorneys

Inventor

By

FREDERICK J. HOOVEN

Marechal & Biebel

Attorneys

Inventor

FREDERICK J. HOOVEN

By Marechal & Biebel

Attorneys

Inventor

By FREDERICK J. HOOVEN

Marechal & Biebel
Attorneys

Inventor

By FREDERICK J. HOOVEN

Marechal & Biebel
Attorneys

Inventor

By FREDERICK J. HOOVEN

Marechal & Biebel
Attorneys

United States Patent Office

Re. 24,584
Reissued Jan. 6, 1959

24,584

PHOTOTYPESETTING

Frederick J. Hooven, Dayton, Ohio

Original No. 2,714,842, dated August 9, 1955, Serial No. 205,576, January 11, 1951. Application for reissue November 26, 1956, Serial No. 624,481

41 Claims. (Cl. 95—4.5)

Matter enclosed in heavy brackets [ ] appears in the original patent but forms no part of this reissue specification; matter printed in italics indicates the additions made by reissue.

This invention relates to photographic type composition and more particularly to a system by means of which text matter can be directly composed, letter by letter, on a photographic film in preparation for reproduction by photolithographic, gravure, photoengraving or other printing process.

The principal object of the invention is to provide a phototypesetting matchine and method by means of which the operator may compose a line by operation of a keyboard in the ordinary manner, with the production of the typed or equivalent record by means of which the line may be checked for accuracy, following which upon the operation of a printing key, the machine will automatically print the line upon a film in selected type faces, quickly and accurately, and accomplish the justification of the line in the process, the operator meanwhile continuing with the composition of a succeeding line.

It is a further object to provide such a machine in which the characters are arranged to be printed by a flashing light source which is of sufficiently short duration that the character is selected while the system is in continuous rotation with the film being advanced in direct correlated relation therewith.

It is also an object to provide such a system in which the flashing of the light source takes place at a predetermined time during the revolution of the system to effect the flashing of the selected character and in which the system continues to rotate for a predetermined whole number of revolutions between successive characters with corresponding advance of the film to thereby obtain proper character spacing.

It is likewise an object to provide a system for selection of the desired characters and the storing of data indication of both the selected character, its sequence in the line, and its width, and to control the flashing of the light source within a single revolution to effect the selection of the characters in the desired sequence, and to delay the flashing while the rotation of the system is continued between successive flashings to effect the amount of film advance corresponding to the width of each selected character.

It is a further object to provide for continuing the rotation of the system between the last character of one word and the first character of the following word for an additional number of revolutions to effect continuous advance of the film, thereby forming spaces between the words.

It is also an object to provide for justifying the line by counting the total width of all the characters in the line, counting once during each revolution of the system the number of word spaces in the line, and repeating the count of the number of such word spaces with continued rotation of the system until the total count equals the maximum available width of the line with the film continuing to advance and thus forming the word space, the system then returning to the selection of characters.

It is a further object to provide such a system in which the same counting operations are repeated for each word space in the line.

It is also an object to provide a system in which pulses are magnetically recorded in predetermined positions to effect selection of the desired characters for printing and in which other pulses are magnetically recorded in predetermined numbers to control the width of the spaces between characters.

It is likewise an object to provide a control by means of which the operator can depart from the standard spacing which automatically occurs upon the selection of a character, and produce a non-standard spacing of a predetermined width, wherever such may be desired.

It is a still further object to provide a control by means of which the operator may effect the kerning of two adjacent characters by interrupting the standard spacing sequence and effecting a selected lesser spacing.

Numerous other objects and advantages will be apparent from the following description, the accompanying drawings, and the appended claims.

Referring to the drawings, they are largely diagrammatic and simplified in order to enable the principles of the invention to be more readily understood, and in some cases such as in the circuit diagrams, only a limited number of character bars and selection circuits are illustrated since they are adequately illustrative of the remainder of the system and to include the entire circuits would greatly complicate and interfere with the ease of understanding the invention. Also, a number of elements are shown fully as such, and thereafter are indicated diagrammatically as they appear in the complete circuit. The diagrams carry identifying data with regard to typical components including values of voltage, resistance, capacitance, inductance, and further identify electronic tubes suitable for the purposes by their common commercial designations, the purpose being to enable one skilled in the art to understand and to be able to reconstruct the apparatus in accordance with the teachings contained herein but not to limit the invention to any such specific data, etc. Throughout the diagrams the following designations have been used in accordance with conventional practice.

Resistance:
- Ω—ohms
- K—1,000 ohms
- M—1,000,000 ohms

Capacitance:
- μf.—microfarads
- μμ or μμf.—micromicrofarads

Inductance:
- mh.—millihenries

In the drawings.

Fig. 1 is a schematic view showing the relationship of the recording, pick-up and erasing head relative to the magnetic or recording member. The same element may be used for all such purposes, viz., recording, pick-up, and erasing although it has been found desirable to utilize separate such heads for the different functions;

Fig. 2 is a showing of a typical circuit for a recorder for recording pulses on a magnetic member;

Fig 3 is a diagrammatic view of a typical circuit for the erasing heads;

Figure 10:
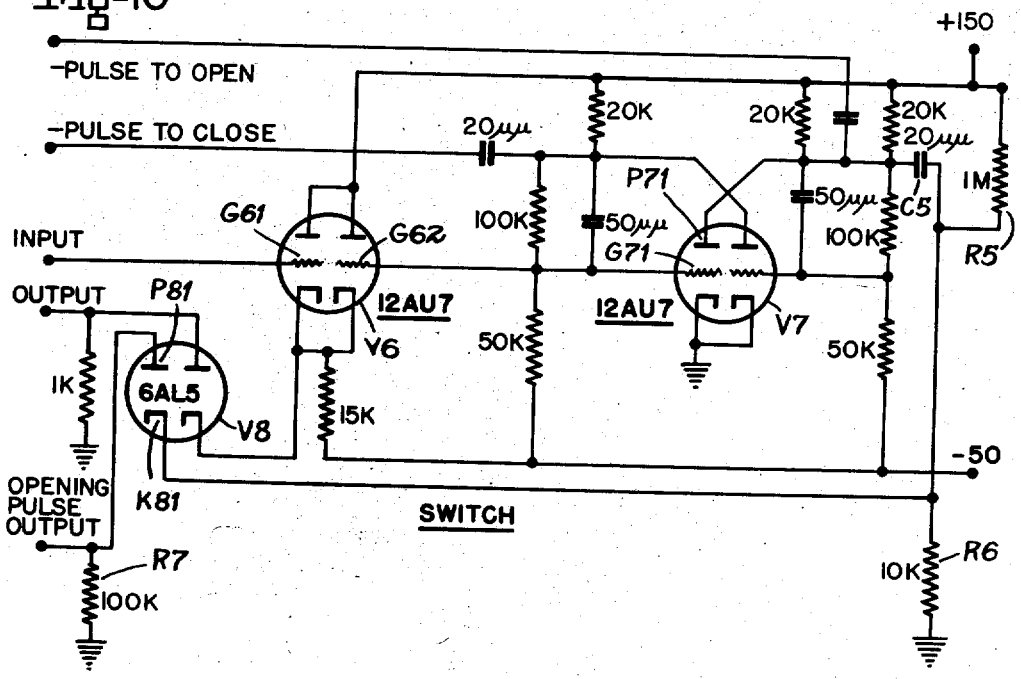
Figure 11:
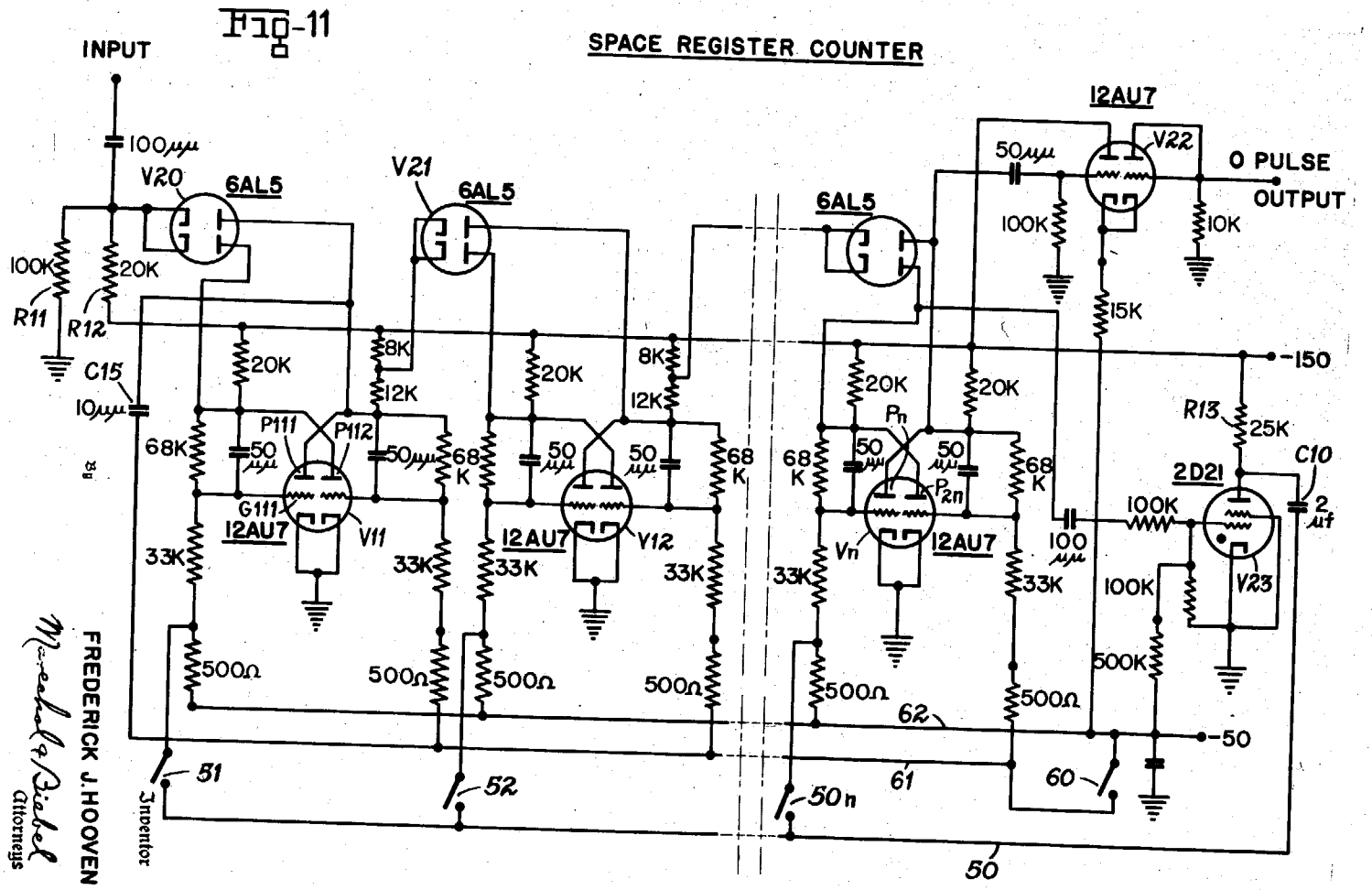
Figure 12:
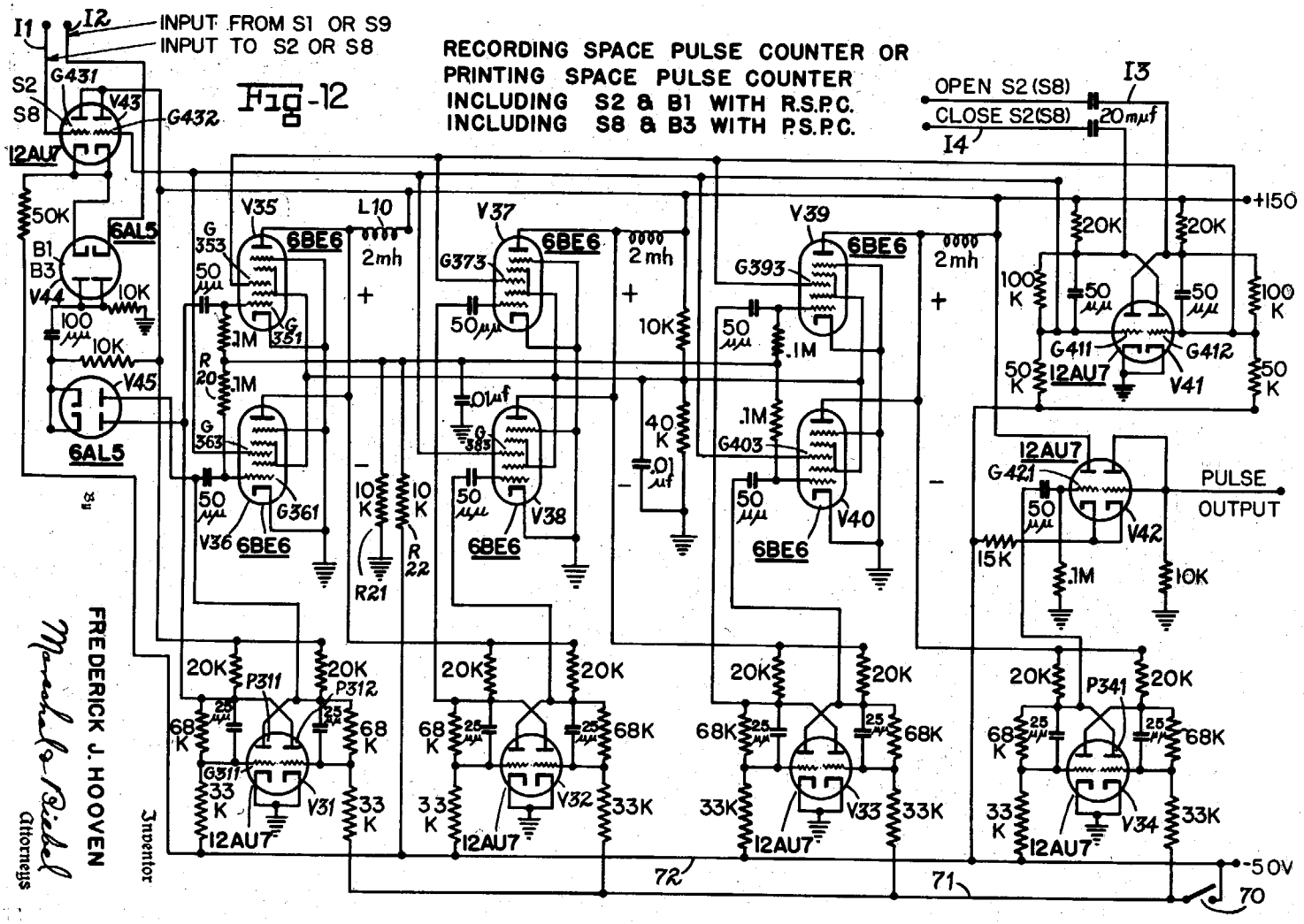
Figure 13:
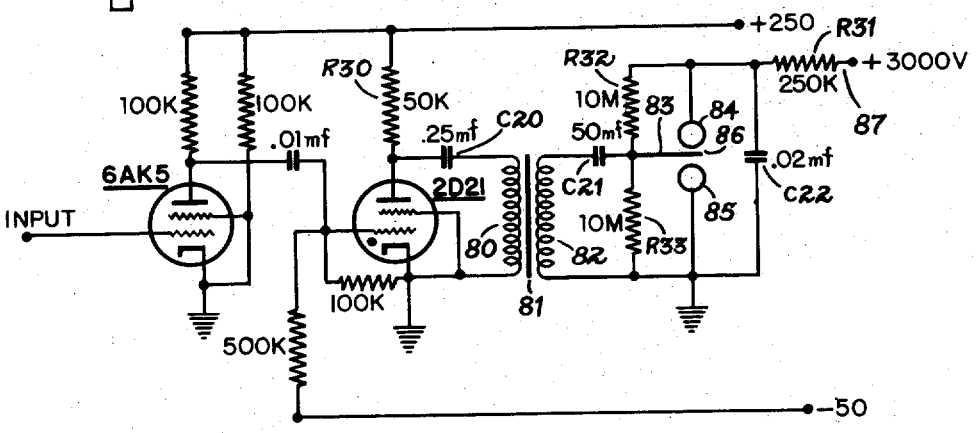
Figure 14:
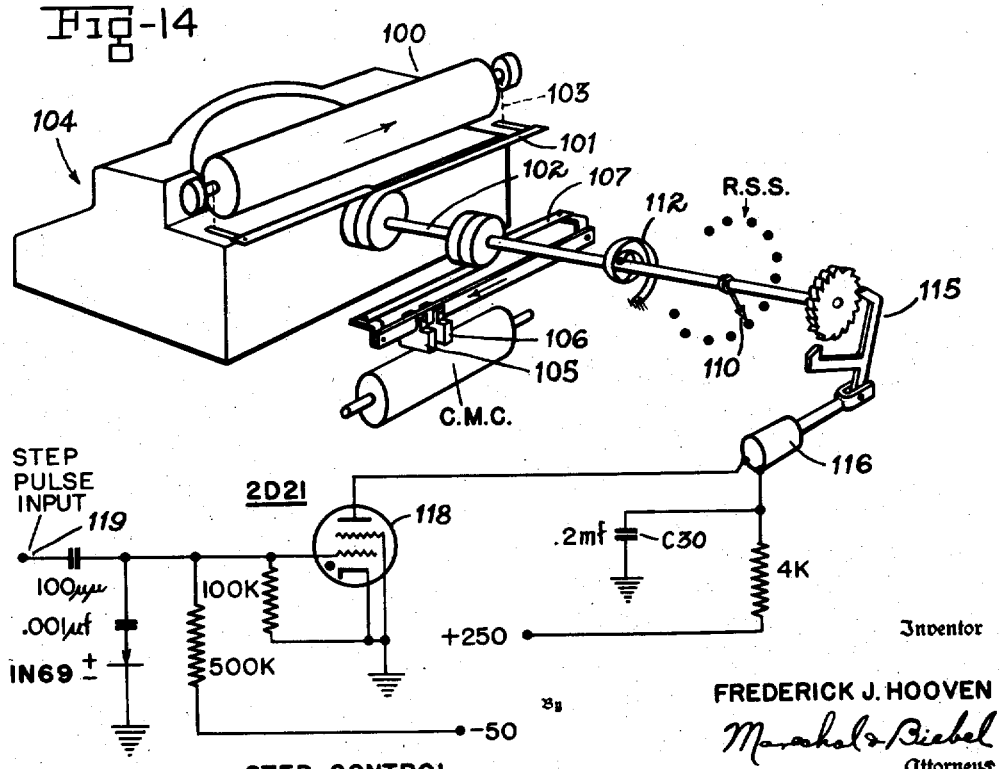
Figure 15:
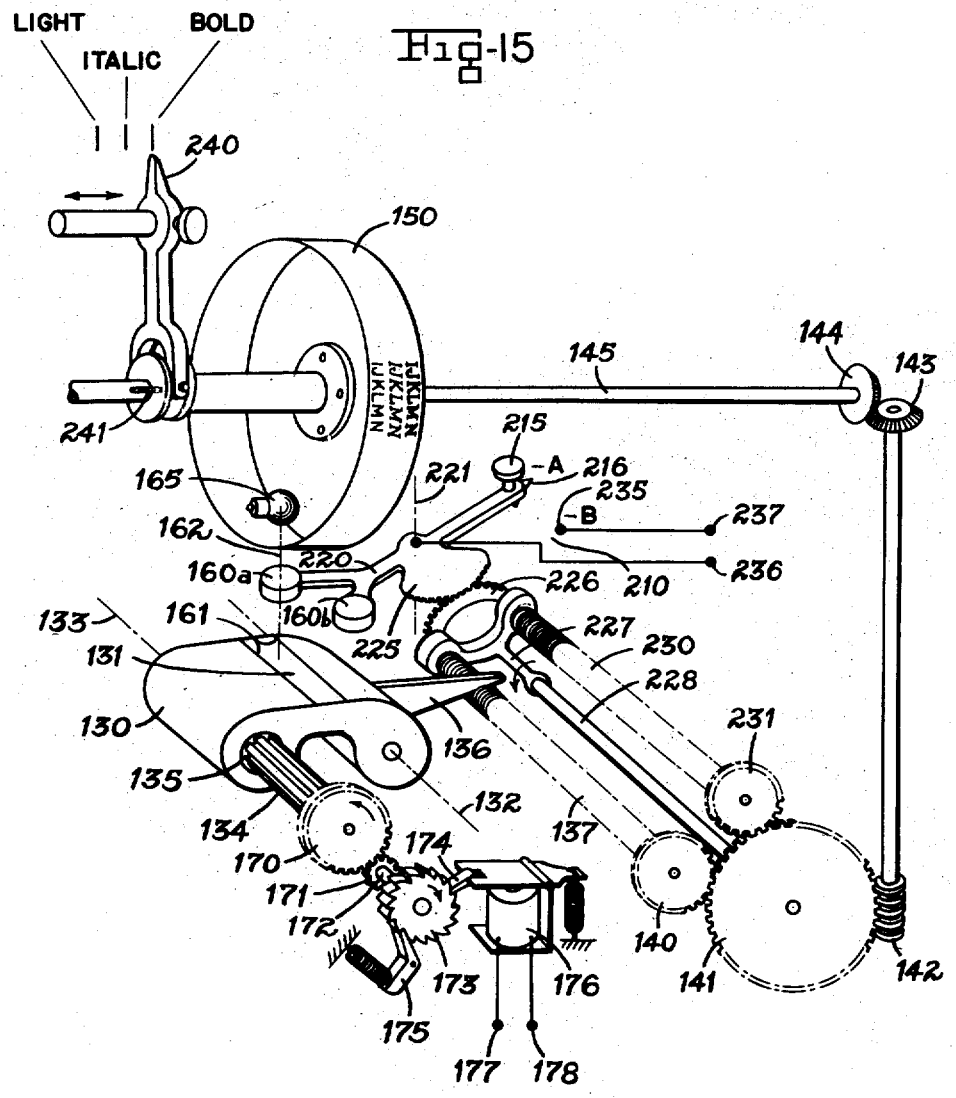
Figure 16:
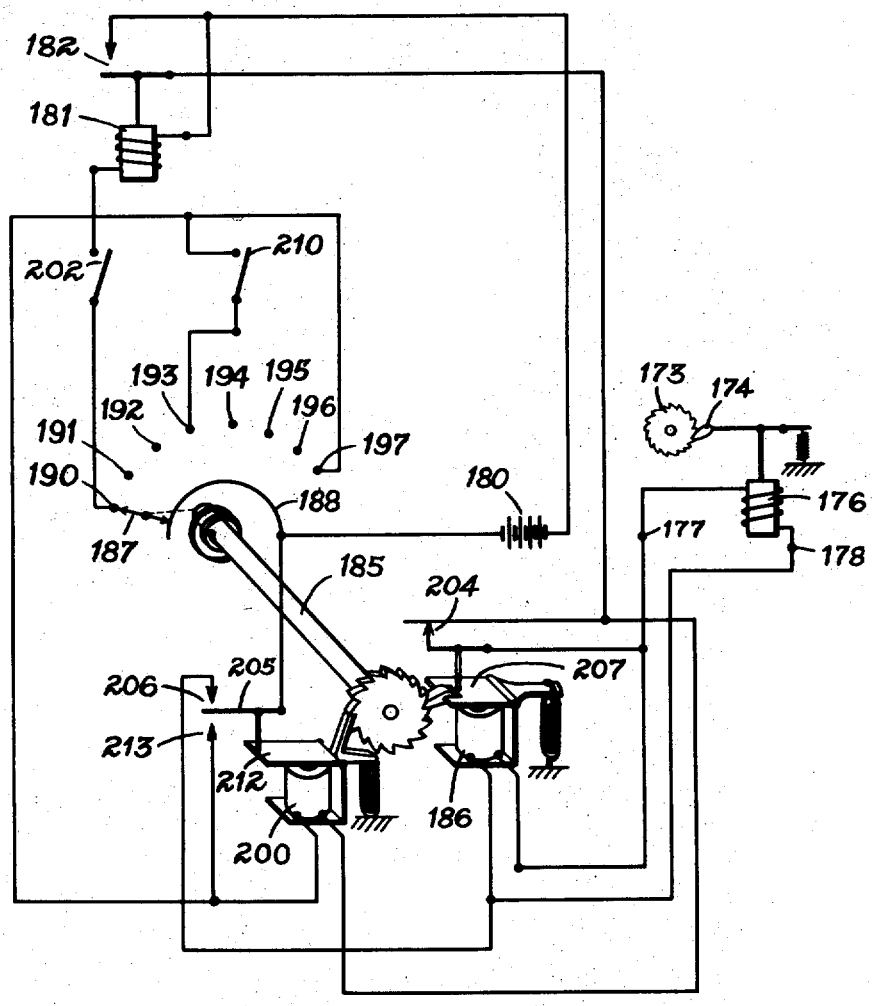
Figure 17A:
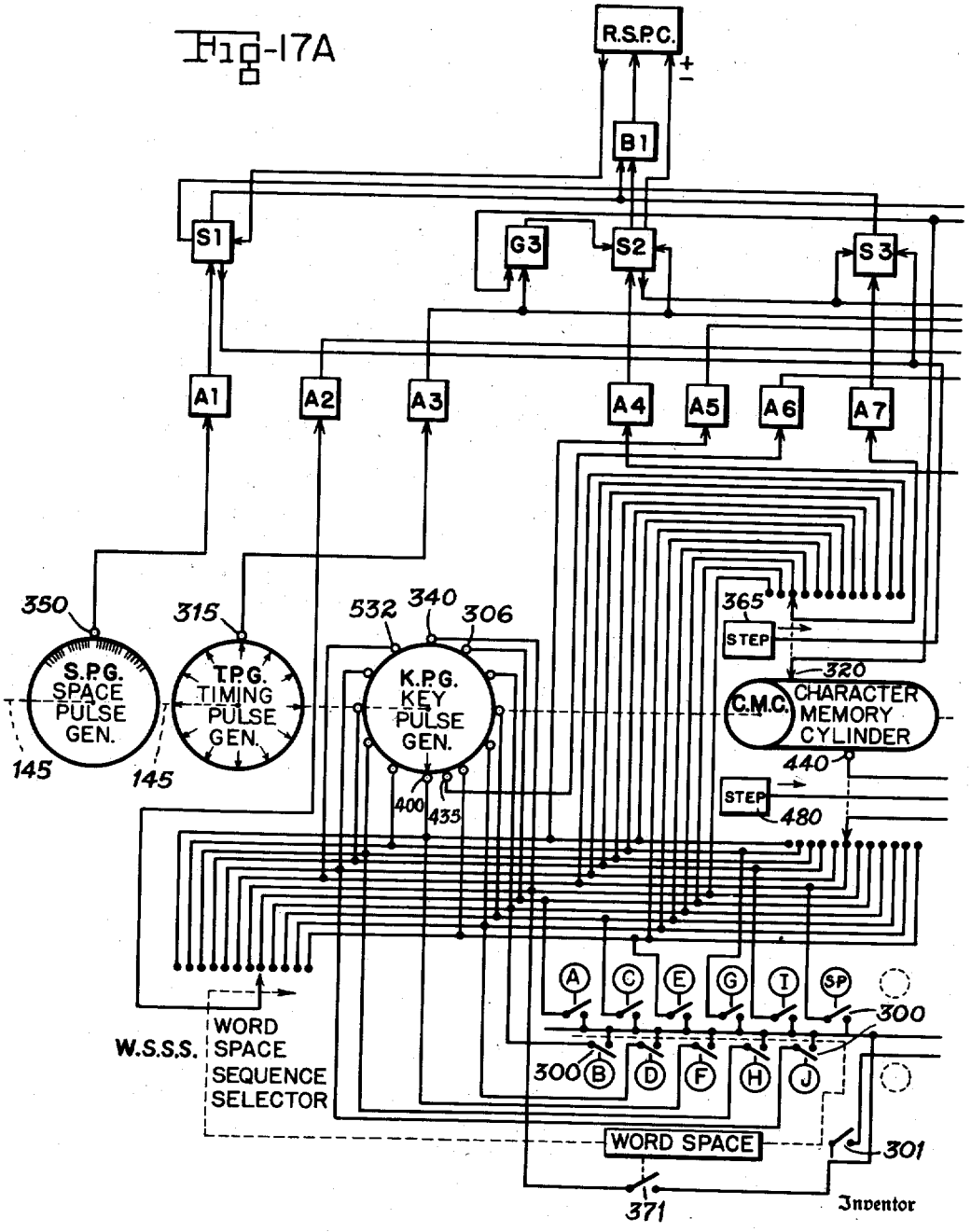
Figure 17B:
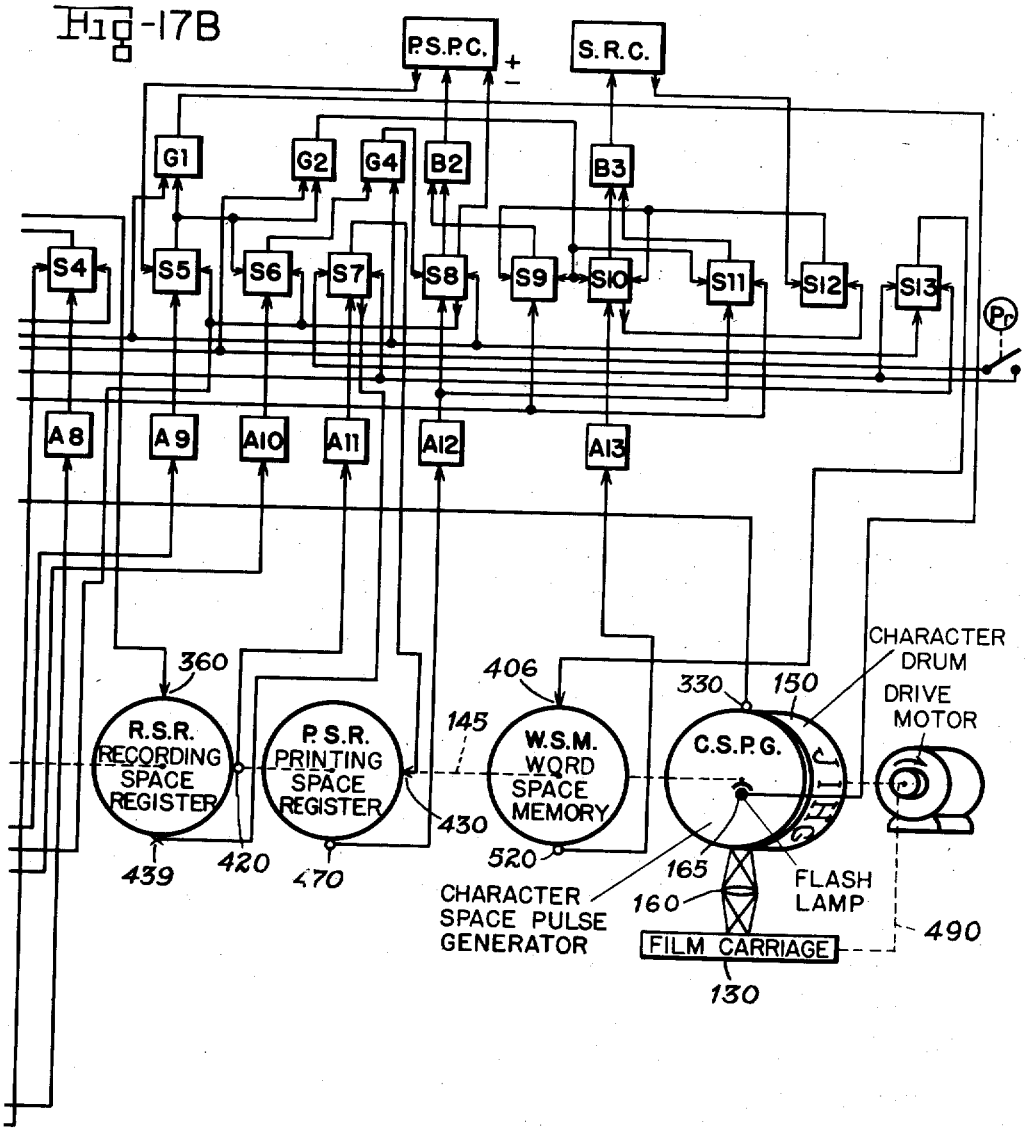
Figure 18:
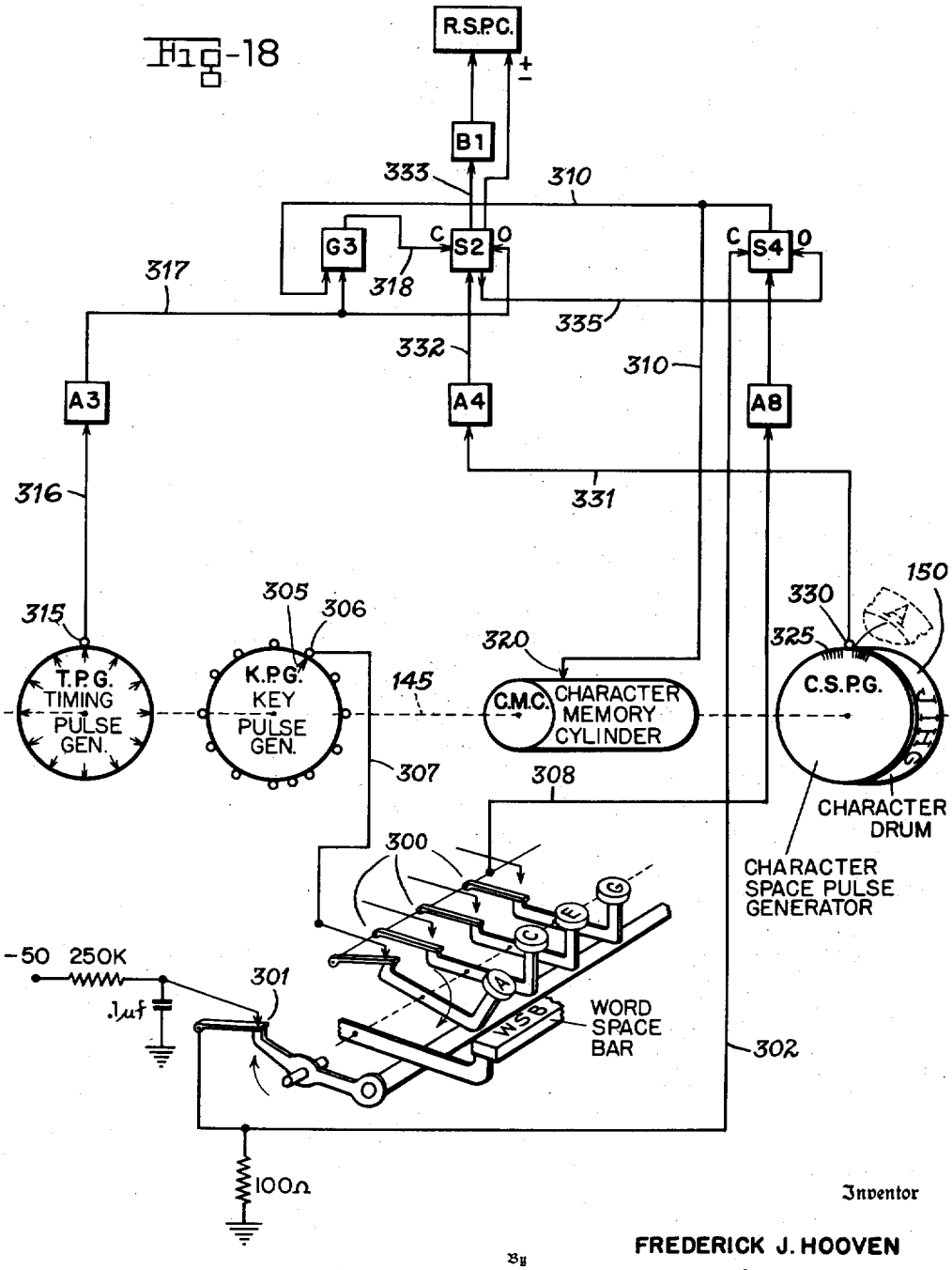
Figure 19:
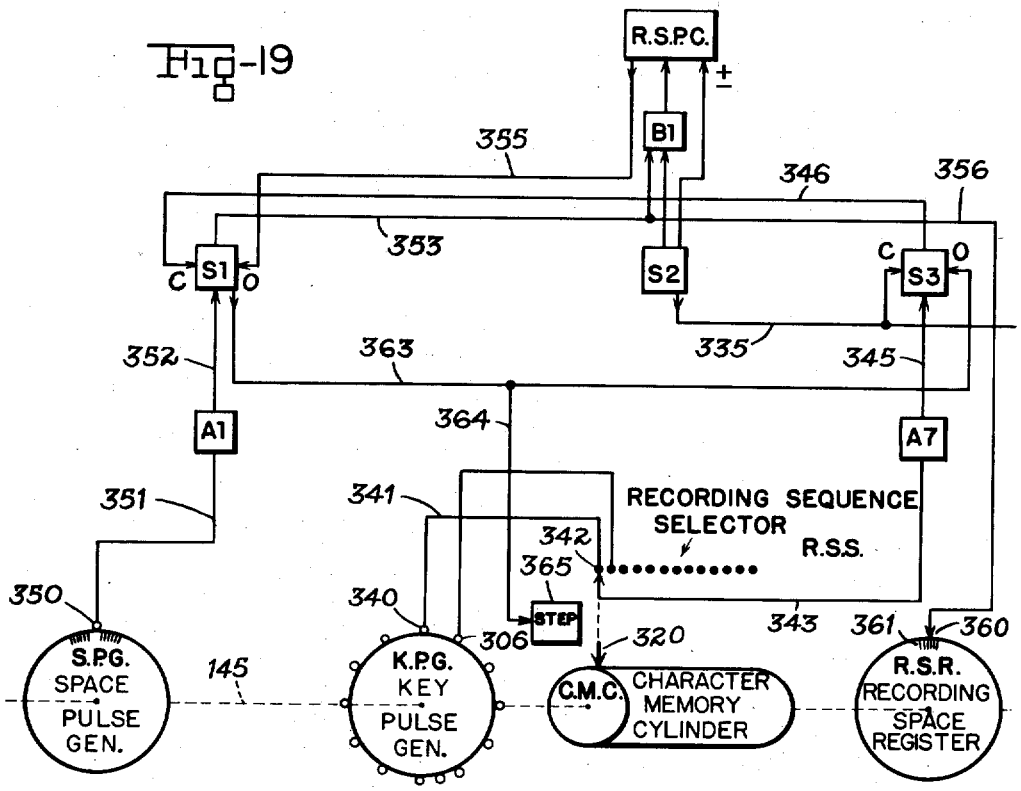
Figure 20:
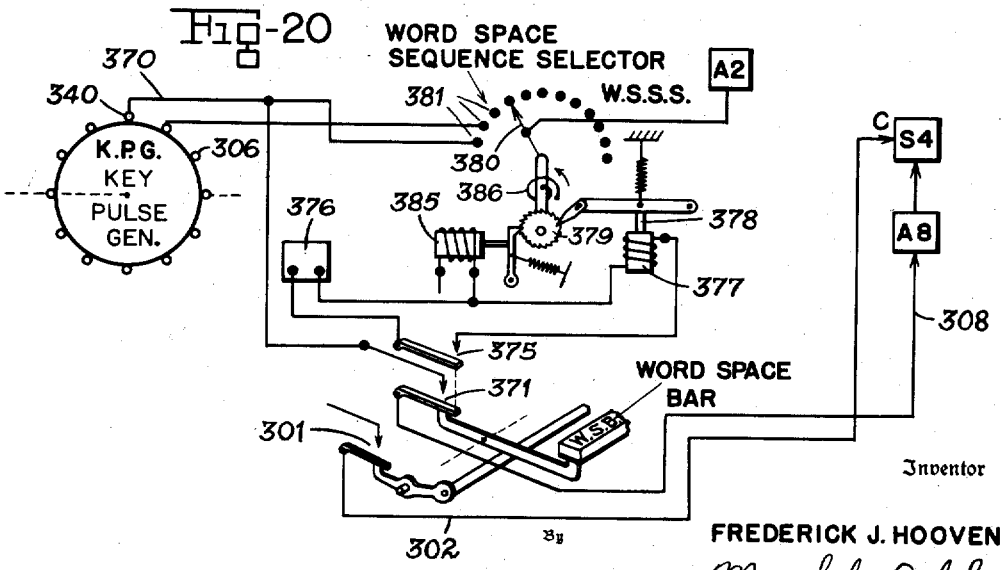
Figure 21:
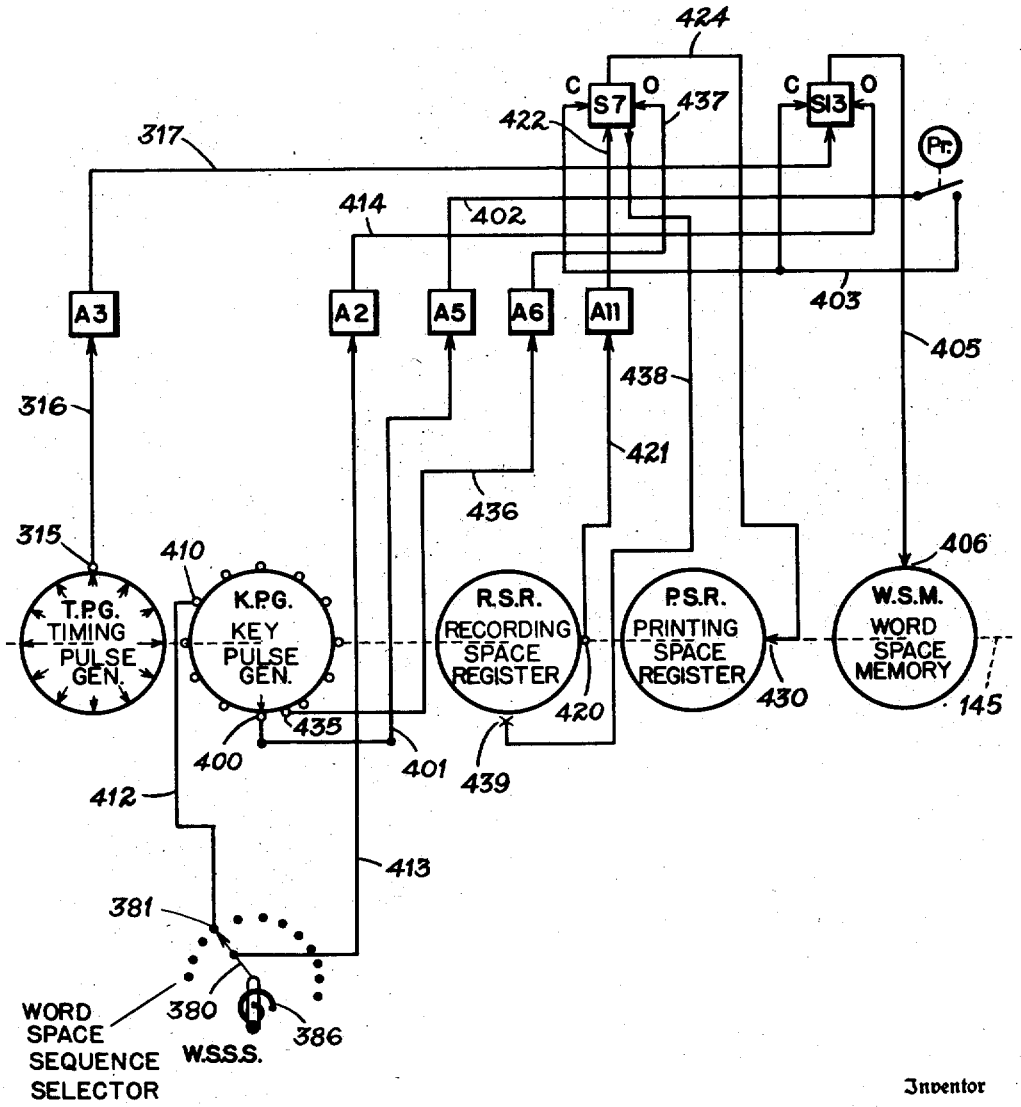
Figure 22:
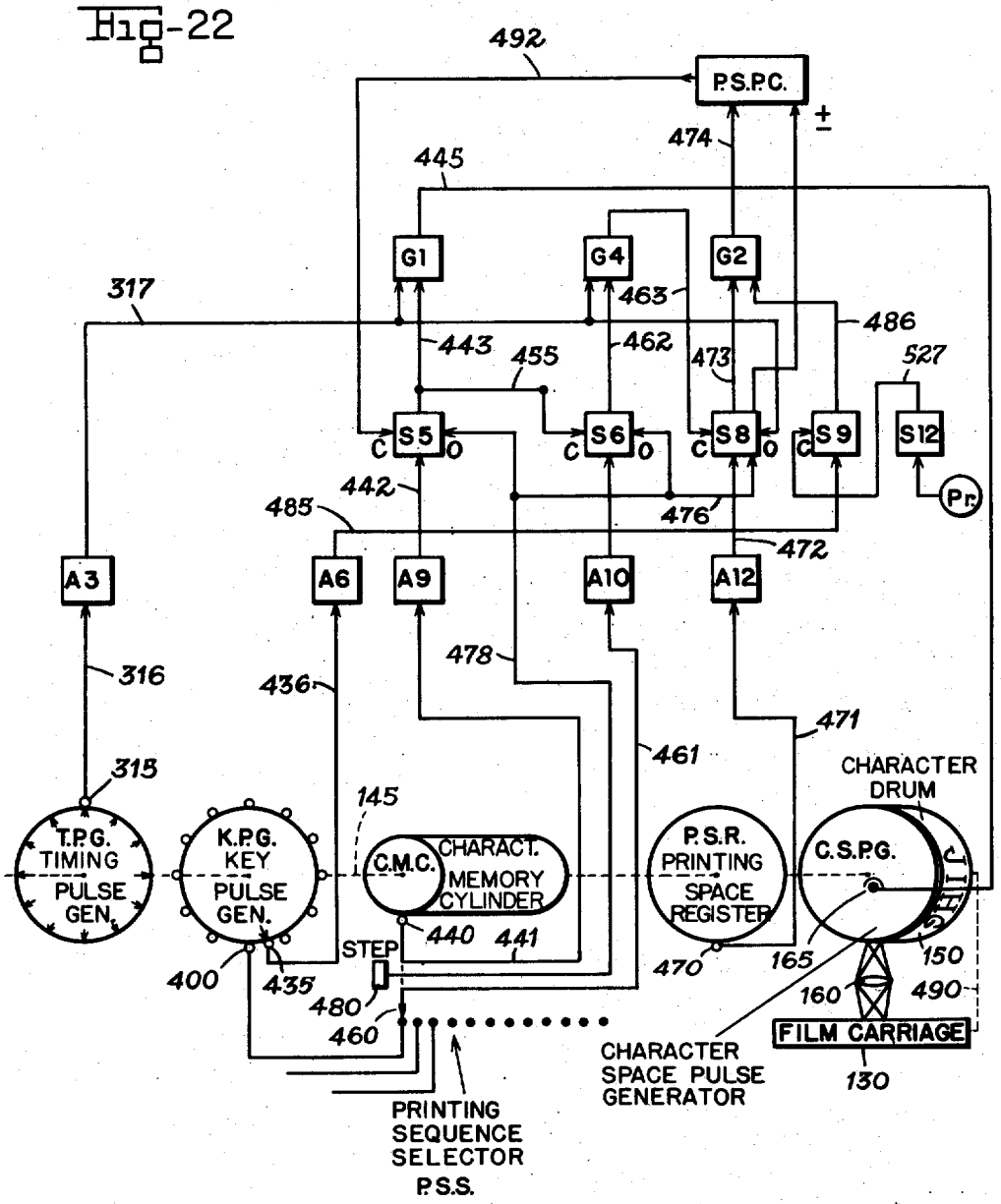
Figure 23:
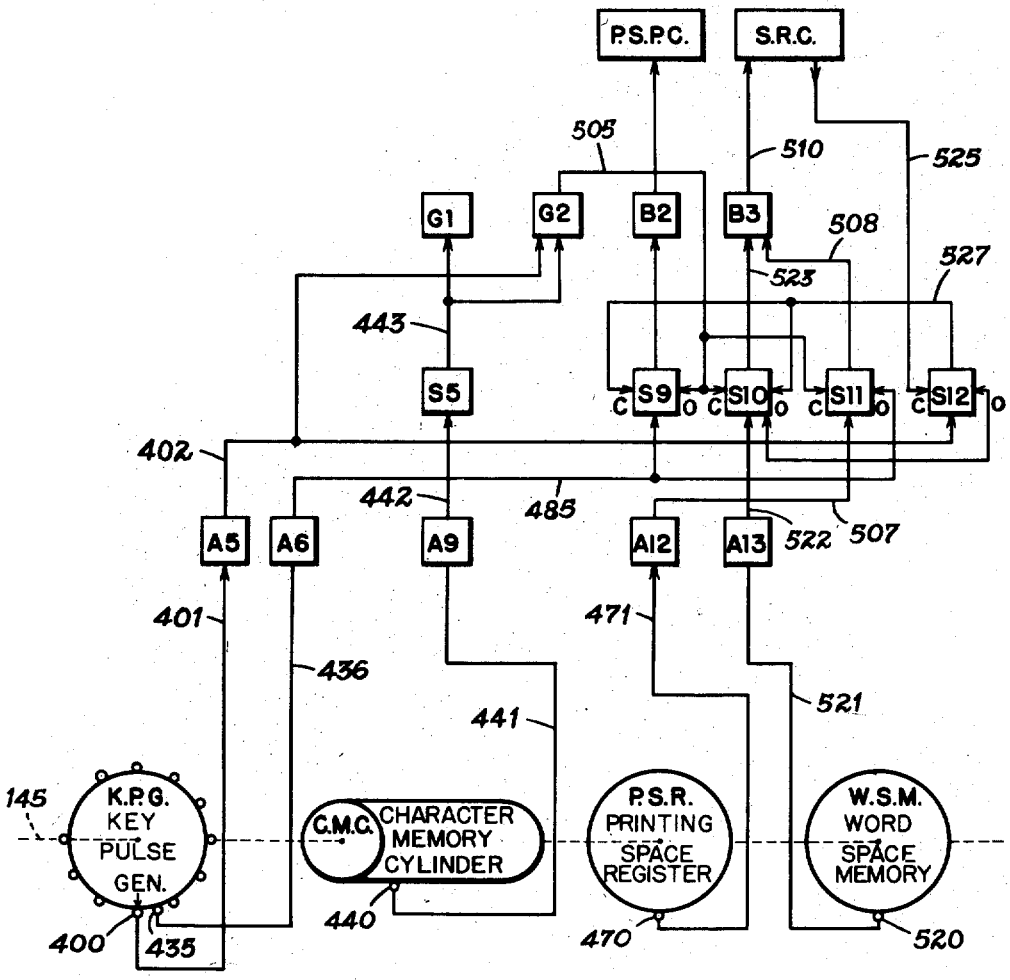
Figure 24:
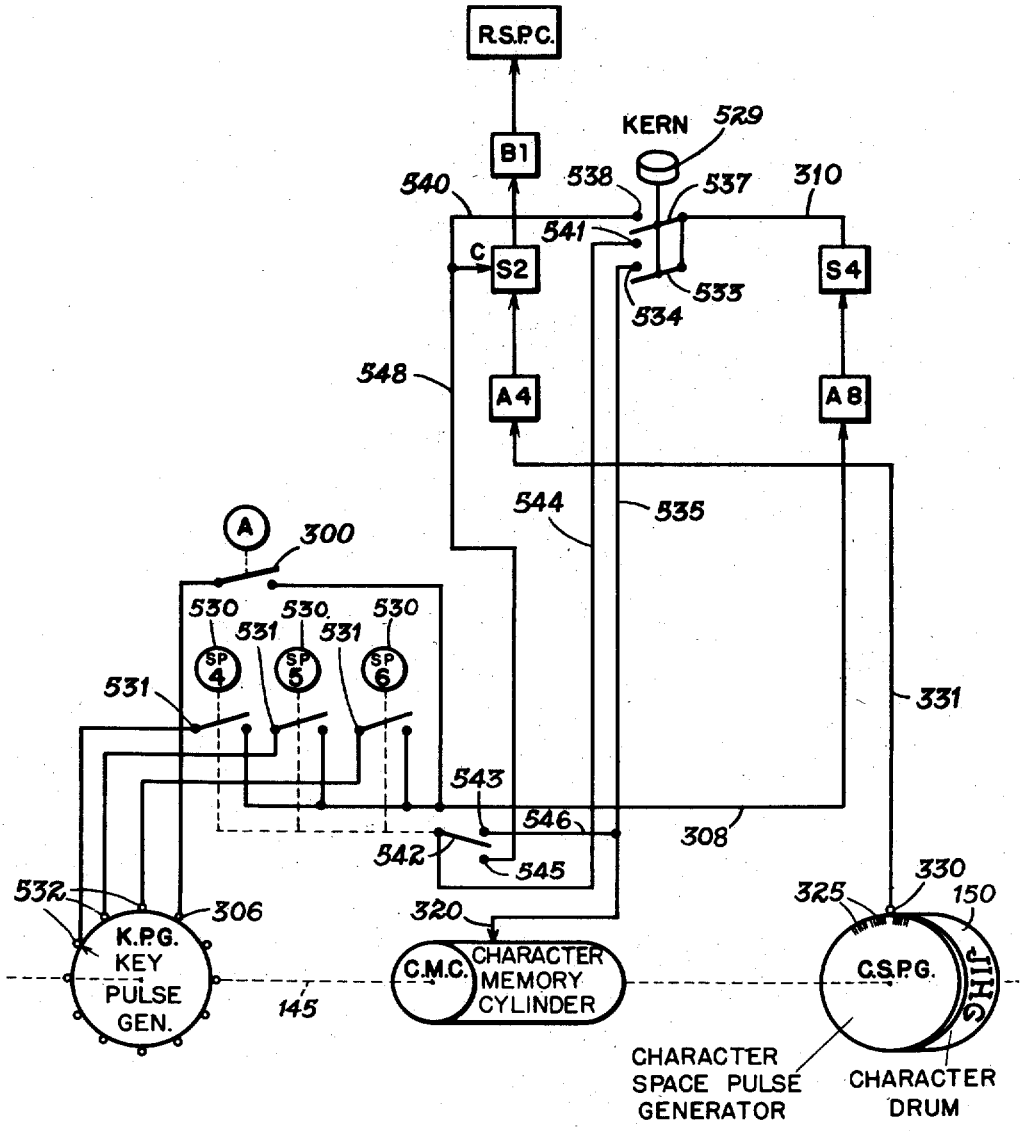

Fig. 10 is a circuit diagram of a switch. In the simplified circuit diagrams which follow the switches are shown with the input at the bottom and the output at the top. The closing pulse, indicated as C, comes in at the left and the opening pulse, designated as O, comes in at the right. Neither of these pulses appears in the output circuit, and a pulse appears in the output in the event one appears at the input only if the switch is closed. When the switch opens, it generates a pulse which appears in the output circuit indicated by a downwardly directed arrow at the lower right;

Fig. 11 is a schematic showing of a portion of the circuits for the space register counter, the actual counter having a larger number of stages, such as 10, with the intermediate stages included between the dotted line break being in all respects similar to those shown;

Fig. 12 is a view showing the circuit for the recording space pulse counter, hereinafter referred to as the RSPC, and since this counter is essentially the same as the printing space pulse counter, PSPC, it also serves to illustrate the circuit for the latter, the several input and output connections being suitably designated for the respective counters;

Fig. 13 is a diagrammatic view showing the circuits for the flashing light control;

Fig. 14 is a combined schematic and diagrammatic view showing the mechanism for advancing the recording apparatus in step by step movements as the selection of the characters takes place;

Fig. 15 is a schematic view in perspective of the mechanism for selecting the desired font and point size, and the film advance and traverse mechanism;

Fig. 16 is a diagram showing the control for the film advance;

Figs. 17A and 17B when taken together form an overall circuit diagram illustrative of the operation of the system but limited, for purposes of better understanding, to include only 12 character selections;

Fig. 18 is a schematic diagram of the portion of the circuits employed in the initial selection of characters;

Fig. 19 is a circuit diagram of the portions of the circuits utilized in recording a sequence of the characters and obtaining the count in the recording space pulse counter corresponding to the width of each selected character in terms of pulses;

Fig. 20 is a circuit diagram showing the controls which are operated upon the actuation of the word space bar;

Fig. 21 is a schematic view of certain of the circuits which are operated upon the closing of the print key;

Fig. 22 is a schematic view of the circuits for printing and flashing the characters in the selected sequence;

Fig. 23 is a circuit view showing the connections for the counters which accomplish the justification of the line; and Fig. 24 is a circuit view showing the circuits which are utilized to effect non-standard spacing of the characters, and for kerning.

The term "film" is used herein comprehensively to avoid the necessity for repeating the various types of record materials which can be used, such term being intended to include all light-sensitive or radiation sensitive sheet or web materials suitable for the purpose; similarly the term "photographic" and its several variations are intended to include the corresponding means or method for producing the latent image thereon.

GENERAL DESCRIPTION

With the machine of this invention the operator sits at a keyboard such as that of a typewriter or a similar board having a larger number of characters, the operation being essentially normal in that the line is typed and a typed copy appears in front of the operator for checking purposes. Alternatively the keyboard or its equivalent may be actuated automatically from a previously prepared record in the form of a tape, wire recording or other suitable record. During this operation the machine stores the pulse data for character selection and spacing by means of magnetic recording generally similar to the recording of sound on tape or otherwise. Preferably the pulses are recorded on discs or cylinders which are mounted on the same shaft as the character drum and thus form part of the rotating system. In this way the entire system is self-synchronous and the exact speed or variations of speed at which it may operate are relatively unimportant.

The magnetic method of registering or recording such data is equivalent to memorizing the same and has the advantage that the data can be erased at the end of the cycle and new data recorded. Furthermore the system operates without physical contact, thus eliminating the wearing characteristics of brushes, contactors or like mechanical means. After the operator has completed a line and checked it for accuracy, he operates a control such as a Print Key which sets in motion the automatic printing cycle and the machine then justifies and prints the line while the operator is composing a new line.

The machine is provided with a character carrier in the form of a master stencil or the like carrying the characters as transparencies and arranged for continuous relative rotation with respect to a flashing light source of extremely short duration. For purposes of illustration and as a preferred embodiment the character carrier is in the form of a drum on the rim of which the characters are carried and rotated continuously and at high speed past the stationary light source which may be a gas discharge lamp or spark. Both the lamp and spark give a flash of light of high intensity and extremely brief duration, as required to effect the flashing of the selected character without blurring.

The film also moves in translation in a continuous predetermined fixed relation with the rotation of the drum, as distinguished from an intermittent travel between successive flashings of the selected characters, and preferably in the direction tangent to the rotation of the drum. The characters are arranged in a single row on the stencil up to the maximum number in any one font, such as approaching 120, including all three cases with special symbols. Different fonts are arranged in other axially spaced rows on the drum and arranged to be brought selectively into proper flashing relation with the film by suitable manual or automatic controls and adjustments. The character drum, the moving film and the several magnetic recording discs as hereinafter described thus constitute a continuously rotating, self-synchronous system.

As a result of the fixed relation between the rotation of the character carrier and the continuous translation of the film, the smallest increment of character space measurement permitted by the machine is the distance traveled by the film in one revolution of the drum. For convenience, this space is referred to throughout as an "iota," or an "i." By suitable change in the ratio between the rotation of the character drum and the amount of film advance, provision is made for varying the linear dimensions of this unit, as may be desired for different fonts and point sizes of type, a suitable relation being about 8 i per em.

Assuming a datum line on the rotating character drum to be considered as the zero angle position, the projection of this line on the film for each drum revolution would be the mark of the i space, and each character on the drum will be printed with a fixed relation to this line regardless of its angular position on the drum. This is accomplished by having each character slightly displaced from the optical axis at the instant of the flash, this displacement being proportional to the angular position of the character on the drum.

It will thus be seen that character selection is measured in fractional portions of a single revolution, that is, by determining the precise instant in the revolution at which the flashing of the light source occurs. Character spacing, on the other hand, is measured in whole revolutions of the system, there being a predetermined number of complete revolutions of the system for each character, depending upon the width or number of space units of that character. The system proceeds to the selection of the next succeeding character only after the completion of the desired number of full revolutions, and thus each character is properly selected and the film properly advances in proportion to the width of that character while the entire system is in continuous rotation.

Similarly when a word space occurs the system provides for continuance of the rotation of the system for a larger number of complete revolutions, thereby advancing the film by a greater amount before returning to its character selecting function, thus forming a space between the last character of one word and the first character of the next word in the line.

In order to accomplish such justification or composition of equal length lines of type, the length of each word space is determined by suspending the process of printing and spacing of characters and the following operation is performed whenever a word space occurs: The total number of spaces occupied by all the previously recorded characters of the line is counted once, then the total number of word spaces (which has been previously recorded) is counted repeatedly, once during each revolution of the system until the total count equals the predetermined total available space in the line. This total count will usually not coincide exactly with a complete number of revolutions and thus will be reached during one revolution of the system, and character printing will be resumed at the end of this revolution. As the total count is exceeded during the completion of this revolution the excess count is retained until the next succeeding word space occurs and the count which takes place at that time starts with this initial count. The same complete operation of counting character and word spaces takes place upon the occurrence of each word space and in this way the line is justified for printing.

The maximum speed of the machine is determined by the maximum permissible speed of the character drum, this being established by the duration of the light flash during the exposure. A speed of 60 revolutions per second gives a printing speed of 60 i per second, equivalent for example to 7½ ems per second, or an average of about 10 characters per second.

The system utilizes electronic control circuits and they are primarily arranged so that they do not require proportional or variable control, but are actuated only into the On or Off position, where they are either conducting or non-conducting. This provides for a high degree of reliability and accuracy, as well as assuring such operating conditions under extremely high speed operation.

The electronic mechanisms are largely operated by and are used to produce electronic pulses. A pulse is here defined as a brief duration of current or voltage in a circuit otherwise not energized. In the present system the pulse is not measured quantitatively but merely its presence or absence is utilized to control the electronic mechanisms. All operating data for the machine is translated into pulses which by their number and timing establish the timing of the light flash within a single revolution and with the proper interval to allow a definite whole number of revolutions of the system which determines the selection and the spacing of the printed characters.

Controls are also provided by means of which the operator can dispense with the normal spacing procedure and provide for the insertion of a non-standard spacing of a predetermined width. Likewise a kerning control is located on the keyboard and by operation of this control concurrently with the actuation of a character key, the normal spacing procedure is interrupted and the operator can then actuate one of the selective space keys to produce a predetermined lesser space than normal for such character, thereby accomplishing kerning, the system returning to normal operation upon release of the kerning control.

DESCRIPTION OF ELEMENTS

*Magnetic recording, pick-up and erasing heads*

In Fig. 1 is shown the magnetic head used for magnetic recording, pick-up, and erasing. This head is generally similar to those widely used in the magnetic recording of sound on wire and tape with modifications necessary for the handling of higher frequencies. Referring to Fig. 2 there is shown a laminated magnetic core structure 10 in which there is incorporated an air gap 11 which is of the order of .003 inch. The core structure is held in close proximity to a rotating disc or drum 12 of non-magnetic material such as bronze which is covered with a thin coating of magnetic material 13 which may be finely divided iron oxide powder with a suitable binding agent or a thin electroplated coating of iron of the order of thickness of the coating of .0002 inch. The magnetic core 10 is wound with two coils of fine wire 15 and 16 which are shown connected in series to terminals 17 and 18. In operation when a current is passed through coils 15 and 16 magnetic flux is caused to flow in core 10 and because of the magnetic reluctance of gap 11 some of this magnetic flux flows through magnetic material 13 in completing the magnetic circuit. This results in the creation of permanent magnetic poles in the magnetic coating 13.

During subsequent operation whenever one of these poles passes the gap 11 a voltage will be generated in the coils 15 and 16 generating a pulse of voltage of wave form generally similar to the impressed current of the recording process above described. As an example, drum 12 may have a circumference of 24 inches and rotate at a speed of 60 revolutions per second. The linear speed of the coated surface past the magnetic gap will be then 120 feet per second. It has been found practicable to record as many as 1000 separate such magnetic poles per foot by these methods and it is therefore practicable to record 120,000 distinct pulses per second. By passing a direct current through the coils 15 and 16 in the opposite direction from that normally used in the recording of pulses it is possible to magnetize the material 13 to the point of saturation which wipes out all previously recorded magnetic poles and thereby erases the recorded pulses and leaves the magnetic circuit ready to receive newly recorded pulses. In the following circuit diagrams the magnetic head generally described above and shown in Fig. 1 incorporating power supplies and amplifying circuits as described hereinafter is represented by the three different symbols shown as part of the figure for the several different purposes of recording, pick-up, and erasing.

With general reference to the electronic circuit diagrams referred to hereinafter certain simplifying conventions of representation have been adopted. All tube types are labeled by the commercial designation commonly used by those skilled in the art and by means of which they may be readily identified. All these tubes are of the general type having indirectly heated cathodes, the cathode heaters with their associated circuits and sources of power having been omitted for the sake of clearness. Likewise sources of plate and bias potential have been indicated in all cases by external characters marked for example +150 and −50, it being understood that these voltages are referred to ground potentials and represent any suitable source of direct current, one of whose supply terminals is connected to ground.

Figure 6:
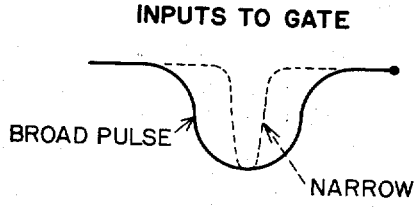
Figs. 6 and 7 show the relationship of the broad and narrow pulses which are utilized in the operation of the gates in the system.
Figure 7:
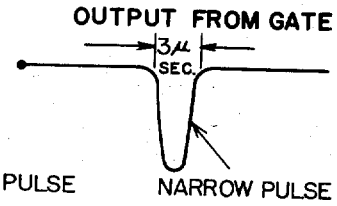

All input and output circuits are likewise returned to ground and when in the unexcited condition will rest at ground potential. All pulses impressed on such input and output circuits consist of a short application of negative potential of the order of, for example, 10 volts. Typical pulse wave forms are shown in Figs. 6 and 7 and will, except where noted, have the form shown in Fig. 7, the duration of which is about 3 micro-seconds.

Referring to Fig. 2 this will be recognized as a two stage amplifier. This amplifier is adapted to respond only to negative pulses, and to that end the circuit is designed so that the input grid G11 of tube V1 operates at a slight positive potential with respect to cathode K11 of tube V1 since K11 is maintained at a negative potential with respect to ground, and current will flow through resistance R1, and from G11 to K11. Under these conditions a relatively large current will flow through R2 and from P11 to K11. The resultant potential across R2 causes a negative bias on grid G21 of tube V2 such that no plate current flows in tube V2. When a negative pulse is impressed on grid G11 the current through R2 is cut off, and this removes the negative bias on grid G21, which allows the flow of current in the circuit consisting of L1, C1 and coils 15, 16 of the magnetic recorder head.

Erasing may be accomplished by discharging a condenser through a typical magnetic head such as shown in Fig. 1. The erasing head may be the same type head as that used for recording and reproducing, but it is preferably wound with a larger number of turns of smaller wire. The discharge of a condenser through the head provides a convenient method of supplying a flow of current of known amount and duration, and in addition provides the desirable characteristic of a current which diminishes smoothly from its maximum initial value to a suitably low value in a known time interval, and thus eliminates the risk of recording an undesirable transient on the magnetic medium when the circuit through the head is opened after erasing.

Fig. 3 shows a circuit adapted to energize an erasing head either by means of the momentary closing of a switch, or by means of a pulse. Condenser 20 is normally maintained in a charged state by a connection to the voltage source through resistor 21. Relay 22, having contactor 23 which is closed when the relay is energized, is connected in series with erasing head coil 24 and contactor 23, such that when contactor 23 is closed, a circuit is established whereby condenser 20 is discharged to ground through coil 24, and relay 22. Switch 25 is connected across contactor 23, so that when switch 25 is closed the discharge current flows. The flow of current energizes relay 22, and closes contactor 23, so that the flow of current continues without regard to the further state of switch 25. When the current has decreased to a value less than that required to hold in relay 22, contactor 23 opens. Condenser 20 is so proportioned with respect to the combined resistances of coil 24 and relay 22 that the duration of current flow is substantially greater than the time required for one revolution of the system. If switch 25 has been opened previously, the discharge current then ceases, and condenser 20 recharges through resistor 21. If switch 25 remains closed, the current continues until switch 25 is opened, at which time condenser 20 is recharged.

Gas discharge tube 30 is also shown, with its anode-cathode circuit connected in parallel to switch 25. When a pulse appears on input terminal 31, the tube is caused to conduct, thus performing the same initiating function as described for switch 25. It will be apparent that either switch 25 or tube 30 may be used without the other or both may be used together, the switch being best adapted for initiation from a mechanical operation, and the tube being adapted for pulse initiation.

For pick-up purposes, a magnetic head such as that shown in Fig. 1 is used, one of the terminals 17 being connected to ground and the other teminal 18 being connected to transmit the induced pick-up pulse into the amplifying and control system.

Amplifiers

Figure 4:
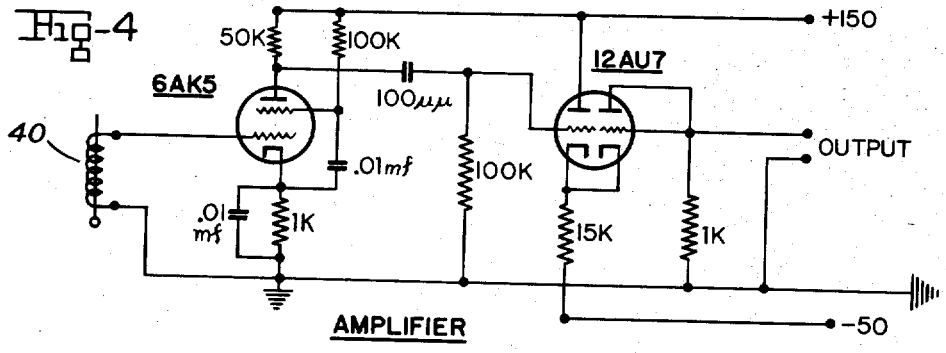
Fig. 4 shows a typical circuit for the amplifiers designated in the system as A1, A2, etc. In the simplified circuit diagrams which follow, all Amplifiers, Gates and Buffers are shown with the input at the bottom designated by an arrow and the output at the top.

Referring to Fig. 4 there is shown the circuit for an amplifier such as represented in the schematic diagram Figs. 17A and 17B as A1, A2, etc. Without detailed discussion the 6AK5 tube and associated circuit components will be recognized as a conventional pentode amplifier whose grid circuit is connected to a magnetic pick-up 40. The output of the 6AK5 tube is coupled to the gird of one section of the double triode tube 12AU7. The first section of the 12AU7 tube is connected as a cathode follower. The second section of the 12AU7 tube with plate and grid tied together functions as a diode rectifier whose cathode is directly connected to the cathode of the first section. The two cathodes of the 12AU7 tube will normally rest at a potential of about 3 volts positive and as a consequence there is normally no current flowing from cathode to anode of the second section. The magnetic pick-up 40 is so connected to the 6AK5 tube that recorded pulses will impress positive potential on the grid of this tube. Thus recorded pulses impressed on this tube will cause negative pulses to appear on the plate of the 6AK5 and on the associated grid of the third section of the 12AU7. Such a negative pulse will impress negative pulses on the common cathodes of the 12AU7. Whenever the cathode of the second section of the 12AU7 becomes negative with respect to ground, current will flow to the anode of this section and through the 1K resistance to which the anode is connected and a negative pulse will thereby be impressed on the associated output circuit. Since the normal potential of the 12AU7 cathodes is somewhat positive, it will be seen that any signal whose voltage is smaller that the amount of this positive bias will not pass through the associated rectifier circuit at all nor will any positive pulses pass through this circuit. As a consequence low-level background signals and undesirable "hash" will not be transmitted.

Gates

Figure 5:
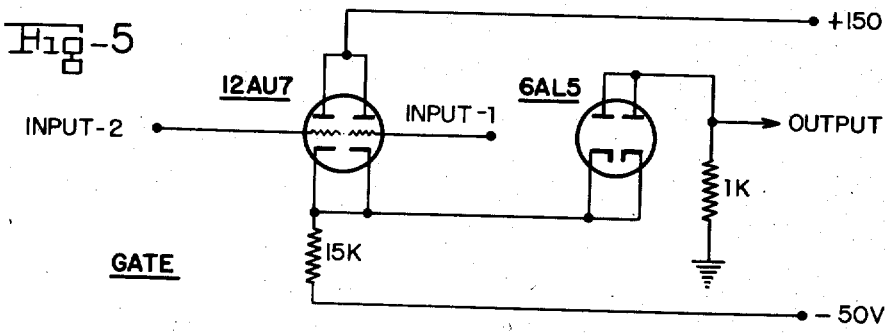
Fig. 5 shows a typical circuit for the gates, similarly designated in the system.

In Fig. 5 is shown a gate circuit which may be defined as an element having two input circuits and one output circuit in which there is no output signal unless signals are simultaneously impressed on both input circuits. The 12AU7 tube shown has both cathodes and both plates connected in parallel in the form of a cathode follower with each grid being connected to a separate input circuit. It will be recognized that both grids rest at ground potential and the cathodes will rest at a small positive potential as above described. If a negative potential is impressed on either grid along current will be maintained in the other section of the tube and the cathode potential will remain substantially unchanged. If however, a negative potential is impressed on both grids, the potential of the cathode will then be correspondingly negative. The 6AL5 tube shown in Fig. 5 is a diode rectifier whose connections and functions are like those described in connection with the second section of the 12AU7 tube shown in Fig. 4.

The gate is used in order to assure that an output pulse will occur only when two input pulses are received either simultaneously or in overlapping relationship. It also serves to provide for accurate timing of the output pulse, this being illustrated in Figs. 6 and 7 where one input pulse is represented as a broad and the other as a narrow pulse. The broad pulse in the condition shown in Fig. 6 is first impressed upon one input of the gate but no output pulse is produced until the later narrow pulse is received, and while the first pulse conditions the gate, the later narrow or sharp pulse determines the exact time at which the gate becomes conducting and transmits its pulse to the output circuit. Thus it is not essential that the broad pulse be timed as accurately since the exact instant at which the output pulse occurs is determined by the timing of the sharp or narrow pulse provided only that it overlaps with the broad pulse.

Buffers

Figure 8:
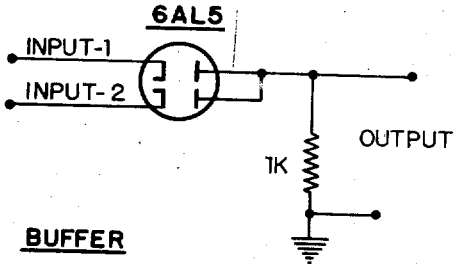
Fig. 8 is a typical circuit diagram of the buffer circuits.

Fig. 8 shows a buffer, which may be defined as an element having two input circuits and one output circuit in which a signal appears on the output circuit whenever a signal appears on either input circuit. The 6AL5 tube shown is a double diode rectifier having both plates connected to the output circuit and each cathode connected to a separate input circuit. When either cathode assumes a negative potential current will flow in that section of the tube and both plates will assume a similar negative potential which will be impressed on the output circuit. No current will flow in the opposite section of the tube since the plate of that section will be negative with respect to its associated cathode.

Flip-flop circuit

Figure 9:
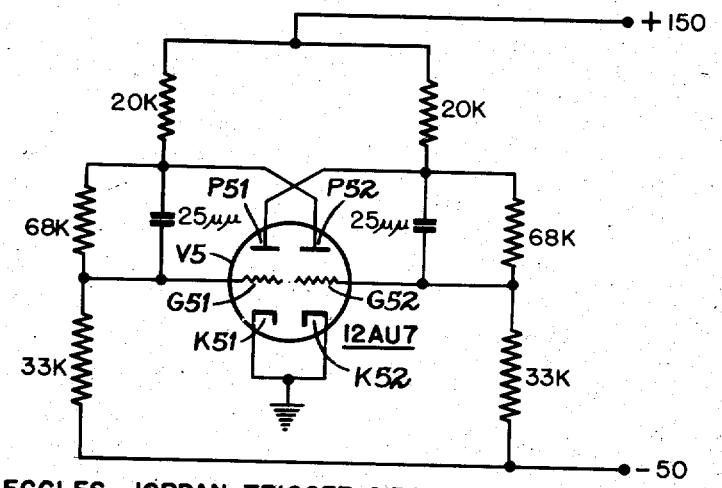
Fig. 9 is a view of a trigger or flip-flop circuit, shown as the Eccles-Jordan trigger circuit which is used in combination with other electronic controls in making up the counter and switch circuits.

Shown separately in Fig. 9 is a typical Eccles-Jordan trigger circuit. This circuit is widely known as a "flip-flop" and will be hereinafter referred to by that term. There is shown a 12AU7 tube V5 having two triode sections, one section having cathode K51, grid G51 and plate P51, the other section similarly having cathode K52, grid G52 and plate P52. Without detailed description it may be stated that this well-known circuit is characterized by the fact that it has two stable positions and in each position one of the triode sections is conducting and the other is non-conducting. As an example, in one stable position in which current is flowing in the first section of the tube the approximate potentials of the various elements with respect to ground will be as follows:

| | |
|---|---|
| G51 | 0 |
| P51 | +30 |
| G52 | −25 |
| P52 | +116 |

In the other stable position in which current is flowing in the second section of the tube the potentials of the various elements will be:

| | |
|---|---|
| G51 | −25 |
| P51 | +116 |
| G52 | 0 |
| P52 | +30 |

It is well-known that this circuit is adapted to shift rapidly from one stable position to another in response to a negative pulse impressed on both grids or both plates or in response to a negative pulse on that associated network to which are connected that grid and that plate having the more positive of the two possible potentials. The flip-flop circuit shown forms an important part of both the electronic switch and the counter circuit to be described below.

Electronic switch

Referring to Fig. 10 which shows an electronic switch, referred to in the diagram as S1, S2, etc., this element may be seen to be a combination of previously described components where V6 constitutes a gate circuit having one grid G61 connected to the input circuit. The other grid G62 is connected to a flip-flop circuit including tube V7. When this flip-flop circuit is in a position such that G71 of tube V7 has a negative potential, this negative potential will be impressed on grid G62 of tube V6. Thus any input signal appearing on grid G61 will appear at the output terminal. When the flip-flop is in the alternative position in which G71 has substantially zero potential, no signal will appear in the output circuit in response to a signal in the input circuit. The position of the electronic switch in which signals appear on the output circuit will be referred to as the closed position, and that in which no signals appear on the output circuit in response to signals on the input circuit will be referred to as the open position. External circuits labeled respectively "Pulse to Open" and "Pulse to Close" are provided whereby the switch may be caused to shift from the open to the closed position or vice versa in response to pulses appearing in the appropriate circuit.

Provision is made whereby a pulse may be emitted as the result of the shift from the closed to the open position. During this process the potential of plate P71 of tube V7 shifts from the more positive to the less positive of its two stable values. The network consisting of condenser C5 and resistors R5 and R6 is caused to impress a negative pulse on cathode K81 of tube V8 causing current to flow to associated plate P81 through resistor R7 thereby impressing a negative pulse at the terminal marked "Opening Pulse Output." The positive pulse impressed on this same network incident to the closing shift is not impressed on the output circuit because of the rectifying action of tube V8 as previously described in connection with Figs. 4 and 5. Thus the electronic switch may be described as a circuit element having an input connection and an output connection, a "Pulse to Open" connection, a "Pulse to Close" connection, and an "Opening Pulse Output" connection. A pulse appearing at the input connection will appear at the output connection following the appearance of a pulse in the "Pulse to Close" connection, but will not appear in the output connection following a pulse in the "Pulse to Open" connection. A pulse will appear in the opening pulse output connection upon the first appearance of a pulse in the "Pulse to Open" connection following the appearance of a pulse in the "Pulse to Close" connection.

Counters

In Fig. 11 is shown one form of electronic counter referred to in the diagrams which follow as the Space Register Counter or SRC. Electronic counters working on the binary number system are commonly used and that shown in Fig. 11 is in its essential characteristics a conventional counter circuit. It will be seen to consist of a plurality of flip-flop circuits as represented by tubes V11, V12 and Vn. It has an input circuit whereby negative pulses may be applied to the cathode of rectifier tube V20. This cathode is maintained at a positive potential by means of the divider network consisting of resistors R11 and R12. This potential is approximately that of the more positive stable value of the plates of tube V11 and thus a negative pulse applied to the cathodes of tube V20 will apply a negative pulse only to the more positive of the two plates of tube V11 and will cause the first flip-flop to shift to its opposite stable state as above described in connection with Fig. 9. Tube V21 whose cathodes are connected to one plate of tube V11 is similarly connected to impress a negative pulse on the more positive of the two plates of tube V12 and similarly when a negative pulse is applied to the cathodes of tube V21, tube V12 will be caused to shift. In this manner each stage of the counter is actuated by the preceding stage.

Thus it will be seen that tube V11 will shift once for each pulse appearing at the input connection. Considering plate P111 of tube V11 it will be seen for example P111 will shift from negative to positive on the first input pulse and will then shift from positive to negative on the second input pulse and so on alternatively thereafter. A negative pulse will be applied to tube V12 by way of tube V21 only when P111 shifts from positive to negative and thus V12 will be caused to shift only once for every two pulses appearing at the input. Similarly a third stage (not shown) would shift only once for every two shifts of the second stage and therefore but once for each four input pulses. The nth stage as represented by tube Vn will then shift once for each $2^{(n-1)}$ pulses and the plate Pn of tube Vn will emit a negative pulse for each $2^n$ input pulses.

Tube V22 is connected as a combined cathode follower and rectifier as described under Fig. 4 above and the negative pulse emitted by plate Pn is accordingly impressed on the zero pulse output connection. For example in a counter as described having 10 stages a pulse will appear in the zero pulse output circuit once for each $2^{10}$ or 1024 pulses appearing in the input circuit. At the same time Pn is emitting a negative pulse, $P_{2n}$ will emit a positive pulse which is coupled to the control grid of gas discharge tube V23 causing this tube to become conducting. This causes a flow of current through resistor R13 thereby impressing a negative potential through condenser C10 on circuit 50.

The series of switches 51, 52 and $50_n$ are provided whereby circuit 50 may be selectively connected in circuit with one grid circuit of each of the counter stages as for example G111 of tube V11. When switch 51 is closed the presence of a negative pulse in circuit 50 will impress a negative pulse on grid G111 causing that grid to assume its more negative potential and associated plate P111 to assume its more positive potential. When P111 shifts from negative to positive no shifting pulse will pass by way of tube V21 to tube V12. Therefore let it be assumed that when tube V11 is in the position where that section of the tube represented by grid G111 and plate P111 is in the non-conducting state, that the first stage of the counter then be in a state to represent the digit "1" and when in the contrary state to represent the digit zero. It will then be seen that when the first stage of the counter shifts from "1" to zero a shifting pulse will be impressed on the second stage of the counter and when the first stage of the counter shifts from zero to "1" no shifting pulse will be impressed on the second stage. By assuming a similar relationship between the digit represented and the state of each stage of the counter it may be seen that a negative pulse appearing in circuit 50 will cause each stage of the counter to shift from zero to "1" whenever its associated switch 51, 52, $50_n$ is closed. The number 1023 will be represented in the system by binary numbers 1111111111. If the 10 stage counter shown then were assumed to have been initially in the [stage] *state* where all stages were set to zero it will be seen that after 1023 pulses have appeared in the input circuit all stages of the counter will be in the "1" state. The 1024th pulse will then cause the first stage to shift from "1" to zero, and to communicate a shifting pulse to the second stage which will likewise shift from "1" to zero and so on for each of the 10 stages so that the result will be that all stages of the counter are again in the zero state. The shift of the last counter stage from "1" to zero will result in the emission of a pulse at the zero pulse output connection and the appearance of a negative pulse in circuit 50. At this time any of the stages may be caused to shift to the "1" position in accordance with the preselected closing of the various switches 51, 52, $50_n$. Thus the counter may be said to have been reset to any desired number P between zero and 1023. It may be seen that after 1024—P pulses have appeared in the input circuit the counter will once more represent the zero count and will reset as described. Thus by selectively closing the switches 51, 52, $50_n$ the counter may be caused to reset after any predetermined number of pulses between 1 and 1024.

The alternate circuit connections for the various flip-flop circuits which constitute the counter are led to the source of negative potential through two circuits 61 and 62. Circuit 61 is connected to the source through switch 60. When switch 60 is open the negative potential is removed from one side of each flip-flop circuit. This destroys the symmetry of the circuit and causes the flip-flop to assume a predetermined state. The connections shown are such that whenever switch 60 is opened momentarily all counter stages will assume the "1" position. When switch 60 is reclosed a negative pulse will be applied through condenser C15 to plate P112 of tube V11. This causes tube V111 to shift from "1" to zero and as previously described all following stages to shift from "1" to zero. This results in a negative pulse in circuit 50 as previously described which then resets the counter to the count predetermined by the setting of switches 51, 52, $50_n$. Thus the initial state of the counter may be definitely determined prior to operation.

The counter described and shown in Fig. 11 may be defined as an element having an input circuit and an output circuit and a plurality of [controls] *control* switches in which a pulse appears in the output circuit following the appearance of a predetermined number of pulses at the input circuit which number is predetermined in accordance with the setting of the control switches.

Referring to Fig. 12 there is shown another design of electronic counter referred to in the following diagrams as the Recording Space Pulse Counter (RSPC) or Printing Space Pulse Counter (PSPC). Also shown on this Fig. 12 are the elements referred to in the diagrams as S2 and B1 in conjunction with the RSPC or as S8 and B3 in conjunction with the PSPC. This counter consists of four stages V31, V32, V33, V34 similar to those described in conection with Fig. 11 and a similar convention will be observed with regard to the relation between the configuration of the diagram and the digit count. That is, that the counter stage represents the digit "1" when that portion of tube V31 including grid G311 and plate P311 is in the non-conducting state. In the description of Fig. 11 a counter was described performing the operation of addition by means of a system which causes each stage of the counter to shift as a result of a shift in the preceding stage from "1" to zero. It will be recognized that a change may be made in the manner of coupling between counter stages such as to effect the shift of a counter stage in response to a shift of the preceding stage from zero to "1," and this may be defined as the operation of subtraction.

In Fig. 12 alternate sets of interstage coupling circuits are shown by means of which it is possible to cause the counter to operate as an adding or subtracting counter, depending on which set of coupling circuits is rendered operative. Interstage coupling is accomplished by the use of a multiple-grid tube such as V36, commonly known as a pentagrid converter. This type of tube is characterized by the use of two control grids, such as G361 and G363 of tube V36, and the flow of anode current in the tube may be cut off by a suitable negative bias on either of these grids. Grid G361 is statically maintained (through R20, R21 and R22) at such a suitable negative bias potential, and is so coupled to plate P312 of tube V31 that it tends to cause current to flow in tube V36 whenever P312 shifts to a more positive state, or as previously defined, when counter stage V31 shifts from zero to "1." Similarly, current will tend to flow in V35 when V31 shifts from "1" to zero with a positive shift of P311. When current flows in the anode circuit of either V36 or V35 it must flow through coil L10, causing a pulse across L10. Since the plate current to both sections of V32 flows through L10, this pulse will cause a shift of stage V32.

Thus with regard to the coupling between stages V31 and V32 it may be seen that the operation of adding may be performed when tube V35 is in a conducting state and tube V36 is in a non-conducting state and the operation of subtracting may be performed when tube V36 is in a conducting state and tube V35 is in a non-conducting state. The same is true with regard to the coupling between stages V32 and V33 in relation to tubes V38 and V37 and with regard to the coupling between the stages V33 and V34 in relation to tubes V40 and V39.

Tubes V35 and V36 are rendered respectively operable and inoperable by impressing a negative potential on grid G363 for performing the operation of addition and similarly the counter is caused to perform the operation of addition throughout by negative biases on grids G383 and G403. Similarly by impressing a negative bias on grids G353, G373 and G393, tubes V35, V37 and V39 are rendered inoperable and the counter performs the operation of subtraction. An additional flip-flop circuit V41 is shown. Grids G363, G383 and G403 are connected continuously to G411 of tube V41. Likewise grids G353, G373 and G393 are connected together and to grid G412 of tube V41. Thus in accordance with the state of flip-flop circuit V41 the counter will perform the operations of either addition or subtraction and will shift from one state to the other in response to a shift of state of V41.

Tube V43 is connected in combination with tube V41 to form an electronic switch circuit as described in connection with Fig. 10, with grid G431 connected to an input circuit and G432 connected directly to G411 of tube V41. The electronic switch comprised of V41 and V43 is referred to in the diagrams as S2 or S8. This switch will be in the closed position when G411 is in its negative state at which time tubes V36, V38 and V40 will be inoperative and the counter will be adding. The output of the switch tube V43 is impressed on one of the inputs of a buffer circuit which includes tube V44 and whose output is connected to rectifier tube V45 to form an input circuit to counter stage V31. Pulses then appearing on the input circuit I1 will be counted by the counter when switch tube V43 is in the closed state. Since the counter is in the adding state as above described whenever this switch tube is in the closed state it then follows that all pulses which appear in circuit I1 will be added to the count of the counter. Input circuit I2 is connected to one input of the buffer circuit which includes tube V44 without any intervening switch tube so that all pulses appearing on I2 will be counted whether switch V43 is open or closed. A negative pulse appearing in the circuit marked "Open S2 (S8)" will cause flip-flop circuit V41 to assume a state such that switch V43 is open. Likewise a pulse appearing in the circuit marked "Close S2 (S8)" will cause the opposite shift of flip-flop V41 corresponding to the closed position of switch V43. Tube V42 is connected as a cathode follower and rectifier as described in connection with Fig. 4 and its input grid G421 is coupled to plate P341 of tube V34 which results in the emission of a negative pulse in the pulse output circuit whenever tube V34 shifts from zero to "1."

Let it now be assumed that all four stages of the counter are in the "1" state resulting in a binary count of 1111, the binary equivalent of the number 15. Let it be further assumed that switch V43 is closed and pulses appearing in input I1 are being added to the count. The first pulse will cause all stages to shift to zero as described in connection with Fig. 11. The total number of pulses P counted will result in a binary count of P—1 assuming that P is a number smaller than 16. Let it now be assumed that a pulse appears in the circuit "Open S2 (S8)" and that switch V43 is opened and the counter shifts to the subtracting state. Then assume that a series of pulses appear at input I2, each pulse subtracting one from the accumulated count of P—1. After P—1 pulses have appeared the counter will shows a count of 0000. The next pulse will cause all stages of the counter to shift from zero to "1" at which time a pulse will be emitted at the pulse output circuit. Thus the counter described may be defined as an element having four input circuits I1, I2, I3 and I4 and one output circuit. As a number P of pulses is impressed on input circuit I1 following the appearance of a pulse on input circuit I4, then following the appearance of a pulse in input circuit I3 a pulse will be emitted by the output circuit when the number of pulses appearing on input circuit [12] *I2* reaches P.

Switch 70 and circuits 71 and 72 serve to determine an initial count of 1111 as described for switch 60 and circuits 61 and 62 in connection with Fig. 11.

Flashing light control

Fig. 13 shows a form of light source for the flashing light and a suitable means for causing the light to flash instantaneously in accurately timed response to a pulse, the form of light source shown being a spark gap. The arrangement of the 6AK5 and 2D21 tubes and their associated circuit components will be recognized as a common form of amplifier and gas discharge tube by means of which the anode-cathode circuit of the gas tube 2D21 may be caused to become conducting in response to a negative pulse appearing at the input circuit. The condenser C20 is normally maintained in a charged state through the resistor R30 connected to the source of positive potential. When the gas tube 2D21 becomes conducting condenser C20 discharges through this circuit, the current of the discharge flowing to ground through the primary winding 80 of spark coil 81. The secondary winding 82 of spark coil 81 forms a circuit from ground through condenser C21 to auxiliary electrode 83 approximately evenly spaced between the main electrodes 84 and 85 of spark gap 86. Primary winding 80 and secondary winding 82 of spark coil 81 are so proportioned that when condenser C20 is discharged through primary winding 80 a voltage of about 4000 volts will be generated in secondary winding 82. Condenser C22 is normally maintained in a charged state through resistor R31 connected to source of potential 87. Electrodes 84 and 85 are separated by a distance which represents a sparking potential substantially greater than that of source 87. The distance from electrode 83 to either of electrodes 84 and 85 will have a sparking potential substantially less than that of source 87. Electrode 83 is normally maintained at a potential approximately equal to half of that of source 87 through equal resistors R32 and R33 whose total resistance is substantially greater than that of resistor R31. The condenser C21 is therefore normally maintained in a charged state through resistors R32 and R33. Let it be assumed for example that the potential of source 87 is 3000 volts and electrode 84 will normally rest at this potential with respect to ground. The potential of electrode 83 will therefore be approximately 1500 volts and therefore the potential difference between electrode 83 and either electrode 84 or 85 will be 1500 volts. Whenever a voltage is generated in secondary 82 of coil 81 in response to a pulse as above described an instantaneous negative potential of about 4000 volts will be impressed on condenser C21 which will then cause electrode 83 to assume a negative potential of about 2500 volts. Electrode 84 having a positive potential of 3000 volts there will then be a potential difference between electrode 83 and electrode 84 totaling 5500 volts, an amount greatly in excess of that necessary to cause a spark to pass between electrode 83 and electrode 84. The spark forms a path of very low resistance between electrode 83 and electrode 84 so that electrode 83 at once assumes a potential approximately equal to that of electrode 84. This is true notwithstanding the connections from electrode 83 to condenser C21 and resistors R32, R33 and winding 82, all these circuit elements being of much higher impedance than condenser C22. As soon as electrode 83 assumes a potential equal to that of electrode 84 as above described the potential difference between electrode 83 and electrode 85 becomes greater than that required to cause a spark to pass. This sets up a low resistance path from electrode 84 to electrode 85 through which condenser C22 then discharges. Because of the low resistance of the discharge path and the relatively high voltage to which condenser C22 is charged the discharge current will be very large in the order of magnitude of 1000 amperes and of very brief duration of the order of 1/10 microsecond and will thus create a flash of light having high intensity and short duration.

Carriage traverse

The arrangement for traversing the carriage in steps of uniform amount as the character keys and word space bar are actuated is shown in Fig. 14. The carriage is shown at 100 coupled by means of a flexible tape 101 to shaft 102. The carriage is shown diagrammatically as connected to the tape at 103 and the general structure of the typewriter or other keyboard selecting device at 104. The recording head M1 and erasing head 106 are stepped in corresponding relation axially along the CMC by means of flexible tape 107 operated from shaft 102, the erasing head 106 being located a space or two ahead of the recording head 105 thus erasing previously recorded data. The switch arm 110 of the Recording Sequence Selector (RSS) is also attached to shaft 102 for like stepping movement. Shaft 102 is normally urged in the clockwise direction by means of spring 112.

The shaft is advanced in a series of steps by escape mechanism 115 actuated by solenoid 116. Solenoid 116 is energized from condenser C30 through gas discharge tube 118 wherever a pulse is impressed on Step Pulse Input terminal 119.

Means are provided for returning the film carriage to the beginning of the line and for initiating the film advance after the film carriage completes the traverse of a line. Erasing heads placed in conjunction with the PSR, and the WSM are energized at this time for obliterating the data recorded thereon, leaving them in condition for receiving new data at the conclusion of the composition of the succeeding line.

The typewriter carriage and associated equipment shown in Fig. 14 may be automatically returned to the position corresponding to the beginning of a line on the operation of the "Print" key. No mechanism is shown for accomplishing this but such mechanisms are common on electric typewriters. Alternatively the carriage may be adapted for manual return.

Film handling

In Fig. 15 the film carrier is shown at 130 carrying film 131, consisting of an enclosed container, which may be used as a removable film magazine. The film is wound from a supply spool which is rotatable about axis 132 onto a receiving spool which is rotatable about parallel axis 133. Axis 133 also forms the axis of splined shaft 134. The whole assembly is free to move in a direction parallel to axes 132 and 133, but the receiving spool is held in fixed angular relation to shaft 134 by splined collar 135, fixed to the receiving spool. Arm 136, attached to carrier 130, engages the threads of screw 137, the axis of which is parallel to axes 132 and 133. Screw 137 is driven by means of gears 140, 141, 142, 143 and 144 from shaft 145. Shaft 145 is in a plane perpendicular to axes 132 and 133. Mounted on shaft 145 is the character drum 150 and the various magnetic recording elements shown in the diagrams and constituting the rotating system. Shaft 145 is in continuous rotation, and the resultant rotation of screw 137 results in a movement of carrier 130 along axes 132 and 133, and this movement bears a uniform relation to the rotation of shaft 145. The distance traversed by carrier 130 for each revolution of shaft 145 is determined by the ratio of gears 140, 141, 142, 143 and 144 and the pitch of screw 137. Lens 160a is proportioned and positioned so that conjugate foci lie on the surface of drum 150 and on the portion of the film exposed through aperture 161 in carrier 130. Light source 165 is shown within drum 150, located on a continuation of the optical axis 162 of lens 160a.

Splined shaft 134 is driven by gear 170, which engages pinion 171, mounted on shaft 172. Also mounted on shaft 172 is ratchet wheel 173, which is engaged by driving pawl 174 and holding pawl 175. Driving pawl 174 is driven by electromagnet 176, having terminals 177 and 178, and is adapted to advance wheel 173 by one tooth each time the magnet 176 is energized and deenergized.

Each time the light 165 is flashed the image of the character then aligned with axis 162 is projected on the film, and as carrier 130 moves uniformly along axes 132 and 133, successive characters are projected to form a line of photographed character images. When carrier 130 has moved a distance equal to the length of a line, arm 136 is disengaged from screw 137 and the carrier is returned to its position corresponding to the beginning of a line, by means not shown. At this time the film is advanced by turning shaft 134 through the operation of magnet 176 as above described, to expose a fresh portion of the film for a newly photographed line, this control providing the desired leading of the film.

Fig. 16 shows magnet 176, having terminals 177 and 178, battery 180, and relay 181 having contactor 182, along with what will be recognized as a common form of telephone stepping switch 185. Successive pulses applied to magnet 186 will cause movable contactor 187 to make connection between common contact 188 and the fixed contacts 190 to 197 inclusive, one at a time in sequential order. A pulse applied to magnet 200 will cause the switch to "reset" under spring action by which is meant that arm 187 will resume its engagement with contact 190. Contactor 182 opens when the relay 181 is energized, and closes when the relay is deenergized. Switch 202 is normally closed, causing relay 181 to be energized when contact 187 is engaging contact 190.

At the end of the photographing of a line of characters, switch 202 is momentarily opened, by means not shown, thus deenergizing relay 181 and establishing the circuit through contactor 182. Current then flows from battery 180 through contactor 182, through contactor 204 to magnets 176 and 186, which are connected in parallel, back to battery 180 through contacts 205 and 206, thus energizing both magnets 176 and 186. Contactor 204 is operated by the armature 207 of magnet 186 so that the circuit is opened whenever the magnet is energized, the result being that the magnet 186 is rapidly energized and deenergized like that of a common doorbell, so long as the circuit remains energized. Each time magnets 180 and 176 are energized, switch 185 is advanced one step and the film spool of carrier 130 is likewise advanced one step. Assuming that switch 210 is open, this stepping will continue until 8 steps have been made, and switch 185 has made circuit through contact 197. This establishes a flow of current from battery 180 through magnet 200. Switch arm 205 is operated by the armature 212 of magnet 200 so that when the magnet 200 is energized the circuit is broken from 205 to 206 and established from 205 to contact 213. Thus the pulsing of magnets 176 and 186 is stopped by the opening of the circuit through contact 206, and the circuit through contact 213 maintains the current through magnet 200 during the process of resetting of switch 185. When 185 has reset, relay 181 is once more energized, which opens the circuit through magnet 200, and the cycle is complete. When switch 210 is closed, however, switch 185 will be reset after only 4 steps. Thus when control 215 and pointer 216 are in the A position (Fig. 15), the film will be advanced 8 steps, while in the B position the film will advance but 4 steps, so the line spacing is therefore adjusted by the same control that adjusts the character size and the character spacing, and in the same proportion.

The distance through which the film is advanced is the desired spacing between lines, and this is determined by impressing on magnet 176 a predetermined number of pulses, thus causing wheel 173 to advance that number of teeth. The means for accomplishing this are described above in connection with Fig. 16.

Selection of point size

In order to print a different sized character a different lens 160b (Fig. 15) may be placed in the position shown for lens 160a. Lenses 160a and 160b are mounted on arm 220, which is adapted to be moved about axis 221 which is equidistant from the two lenses, by means of handle 215. Pointer 216 engages the two marks A and B, to indicate which lens is in the operating position, and there is preferably some type of detent or locking mechanism to position the assembly accurately in either of these positions. Movement of the point 216 from A to B will move lens 160a out of the operating position and move lens 160b into the operating position. At the same time, toothed sector 225 which is attached to arm 220 engages sector 226, which is attached to arm 227, causing arm 227 to rotate about axis 228. The arm 227 carries the bearings for screw 137 and screw 230, and its resultant movement is such as to cause screw 230 to replace screw 137 in engagement with arm 136. Screw 230 is driven from gear 141 through gear 231, which is assumed to have the same number of teeth as gear 140, so that both screws rotate at the same speed. Axis 228 is concentric with gear 141 and parallel to both screws, so that the relative mesh of the respective driving gears 141, 140 and 231 is not disturbed by moving both screws about axis 228.

Let it be assumed that lens 160b is of such focal length and location as to project on the film an image of any given character just half as large as that projected by lens 160a. Screw 230 may then have just half the pitch of screw 137, so that the advance of carrier 131 per revolution of shaft 145 will be only half as much when lens 160*b* and screw 230 are in operation as it is when lens 160a and screw 137 are in operation, but the advance of carrier 130 per revolution of shaft 145, in proportion to the dimensions of the projected character image, will be the same in both instances.

Pointer 216 makes electrical contact with contact 235 when the pointer is in the B position, and pointer 216 and contact 235 are connected with terminals 236 and 237, this combination forming a switch circuit 210 which is used to [determint] *determine* the size of the line space as described in connection with Fig. 16.

Without detailed description it will be evident that other lens and corresponding film travel drives may be provided as desired for an entire range of point sizes.

Font selection

Selection of a desired font may be effected by setting the control 240 which slides the character drum 150 on its spined connection 241 on shaft 145.

Recording

The operation of the system will be described by reference to the diagrammatic drawings Figs. 17A, 17B and 18 through 24. In order to show and describe the circuits and operations without undue complication, a system has been shown incorporating only 12 character angles, corresponding to different keys or functions. The system is completely disclosed with respect to such 12 character angles, shown as representing 30° each. It will of course be understood that in a commercial embodiment, a substantially greater number of character angles will be employed, such for example as 120, thus making each character angle equivalent to 3°. The circuits and their operation however remain the same as herein described.

The main elements of the rotating system are indicated in Figs. 17A and 17B in a diagrammatic way and as there shown they comprise a number of magnetic recording discs or drums which are described as follows. The Space Pulse Generator (SPG) has a number of pulses permanently recorded thereon at each character angle equal to or greater than the maximum number of units of width of any of the characters for example, sixteen. Further, the position corresponding to the beginning of each character angle, is left blank, the first of the group of recorded pulses in the character angle thus being offset from the true character angle positions, in each case. A single pickup is located at the zero or datum line position for the recording operation.

The Timing Pulse Generator (TPG) is a magnetic disc or drum having a single sharply defined and relatively narrow pulse permanently recorded thereon for each character angle [is] *as* indicated in Fig. 7, such pulse being accurately located in the position at the beginning of each character angle. The TPG has a pickup head associated therewith in the zero angle or datum position.

The Key Pulse Generator (KPG) is a magnetic disc or drum having a single relatively broad recorded pulse permanently recorded thereon as indicated in Fig. 6 and is provided with a series of pickup heads, one being located at each character angle position.

The Character Memory Cylinder (CMC) is a cylindrical magnetic member having a recording head associated therewith in the top or zero angle position for recording and a pickup head associated therewith, preferably opposite the recording head in the bottom or zero angle position for printing. Separate stepping controls are provided for stepping the respective recording and pickup heads axially along the cylinder as the several characters are selected and recorded, and later transformed in the printing operation, in accordance with successive selections of characters or word spaces in the line of composition.

The Recording Space Register (RSR) is a magnetic recording disc or drum without any permanently recorded data thereon having a recording head in the zero angle position for recording, a pickup head to some arbitrary angle and [on] *an* erasing head opposite the pickup head.

The Printing Space Register (PSR) is likewise a magnetic disc or drum with no permanently recorded pulses thereon having a recording head in the angular position corresponding to the pickup on the RSR and a recording head in the bottom or zero angle position for printing.

The Word Space Memory (WSM) is a magnetic disc or drum having no permanently recorded data thereon and provided with a recording head in the zero angle position for recording and a pickup head in the zero angle position for printing.

The Character Drum or character carrier is preferably in the form of a cylinder with the characters in the form of a series of transparencies or stencils arranged around the circumference thereof and with a source of flashing light internally thereof to provide for the projection of an image of the selected character when in the proper position for printing. In addition, and preferably as a part of the character drum, there is an associated magnetic disc referred to as the Character Space Pulse Generator (CSPG) which has pulses recorded thereon for each font in each character angle corresponding to the width of that character, or an arbitrary number of pulses for special purposes.

The entire system above described may be mounted on a common shaft and is driven by a suitable motor shown in Fig. 17B in a clockwise direction at essentially a constant speed, although variations in speed are relatively unimportant because the system is self-synchronous and does not require maintenance of an absolutely constant speed drive.

Referring first to Fig. 18, a portion of a keyboard is shown with a series of switches 300, one of which is associated with each of the keys and arranged to be closed upon the actuation of that key. There is another common switch 301 and means are provided for effecting the closing of such switch 301 whenever any of the keys or the word space bar (indicated in Fig. 20) is actuated. Upon the actuation of one of the keys, represented as the letter A, a circuit is closed from the single pulse generating network shown in Fig. 18, through switch 301 in line 302 to effect the closing of switch S4. A single pulse occurs in this circuit upon the closing of switch 301, and hence in response to the actuation of any of the keys or of the word space bar, and only a single pulse occurs regardless of the length of time the key or the word space bar is depressed. Switch S4 immediately closes in preparation for the transmission of a pulse therethrough.

The single reference pulse indicated at 305 on the Key Pulse Generator (KPG) in the course of its rotation passes by the pickup 306 corresponding to the actuated key A, and this causes the induction of a pulse in the circuit including line 307, key switch 300, and line 308 to amplifier A8 where the pulse is amplified to a suitable level. It then passes through switch S4 which has been closed and through line 310 to gate G3. Upon the transmission and overlapping of the accurate pulse from the Timing Pulse Generator (TPG), through its pickup 315, line 316, amplifier A3 and line 317, the gate G3 becomes conductive and it transmits the pulse from the TPG through line 318 to cause the closing of switch S2. Simultaneously the pulse from the KPG travels through line 310 to the recorder head 320 where it is applied in the first line position on the Character Memory Cylinder (CMC). Since the CMC is turning with the system including the KPG, the pulse is located axially of the cylinder corresponding to the position of that character in the line, and circumferentially upon the cylinder corresponding to the selected character.

The Character Drum 150 (CD) is also rotating with the system on shaft 145 and the letter A is arranged in predetermined position corresponding to the predetermined circumferential arrangement of the characters. The magnetic portion of the drum, identified as the Character Space Pulse Generator (CSPG) has separate groups of pulses such as indicated at 325 corresponding in number to the width in iotas of the individual characters with which they are associated. The letter A for example may have an iota width of six units and there will accordingly be six pulses on the CSPG in the character angle position corresponding to this character.

A pickup 330 is arranged in magnetic relation with the pulses on the CSPG and thus these pulses are transmitted through line 331 to amplifier A4 where they are amplified and passed by way of line 332 through closed switch S2 and through line 333 to buffer B1 from which they pass into the Recording Space Pulse Counter (RSPC).

The above operations take place extremely rapidly and thus the counter RSPC has counted six pulses corresponding to the character width of the selected character. This counting has been completed before the system has traveled through one character angle and hence upon the next traverse of one of the timing pulses on the Timing Pulse Generator (TPG) past its pickup 315, a pulse is transmitted through lines 316 and 317 to cause the opening of switch S2. Upon opening, switch S2 produces a pulse which is transmitted through line 335 to cause the opening of switch S4, thereby opening the circuit through which the initial character pulse was transmitted and preventing any possibility of repeat operations even through the actuated key is left in depressed condition for more than a revolution of the system.

The same pulse from switch S2 which caused the opening of switch S4 is transmitted through line 335 (Fig. 19) to cause the closing of switch S3, thus preparing a circuit for a further recording cycle as follows. When the one pulse on the KPG reaches the position indicated by pickup 340, corresponding to the first character position in the line, a pulse is [generaed] *generated* and transmitted through line 341, the first contact 342 of the Recording Sequence Selector (RSS), and line 343 to amplifier A7, the switch contact on the RSS occupying the first character position in the line at the beginning of the composition of that line and corresponding to the extreme righthand position of the carriage.

The amplified pulse is transmitted from A7 through line 345, through closed switch S3 and thence by line 346 to cause the closing of switch S1. Upon closing, switch S1 prepares a circuit for the operation of the Counter (RSPC). This circuit is established immediately upon traverse of the pulse on the KPG under its pickup 340, and at the same time the pickup 350 on the Space Pulse Generator (SPG) is in position to pick up the pulses on that element, of which there are a sufficient number in each character angle to correspond with the maximum character width that is required. Accordingly the pulses are picked up by the head 350 and transmitted through line 351 to amplifier A1, line 352 to closed switch S1, and line 353 to the alternate channel through buffer B1, from which they travel to the Counter RSPC. However when the pulses enter through this particular channel they actuate the counter to subtract rather than to add, and thus the counter counts back from the six pulses which it had registered, until it reaches the zero position. Upon reaching zero position the counter RSPC generates its own pulse which is transmitted through line 355 to cause the opening of switch S1.

Meanwhile the six pulses which were collected from the SPG are transmitted by a branch line 356 to the recorder 360 on the Recording Space Register (RSR) where they are magnetically recorded as shown at 361 in the angle corresponding to the first character in the line, with the number of pulses corresponding to the width of that selected character.

Upon the opening of switch S1 further counting of the pulses from the SPG stops and an opening pulse is transmitted through line 363 to cause the opening of switch S3 and through a branch line 364 to cause stepping device 365 to advance the Recording Sequence Selector (RSS) as well as the recorder head 105 on the CMC to the next positions in the line, in preparation for the similar recording of the next character.

When the word space bar is actuated the same common switch 301 is closed to cause the closing of switch S4 and a selected one of the pickups on the KPG is conditioned to transmit a pulse when the recorded pulse passes under that head. Preferably the selected head is the same as that corresponding to the initial line position, and thus as shown in Fig. 20 when the recorded pulse on the [YPG] *KPG* passes under head 340 a pulse is transmitted through line 370, word space switch 371 (corresponding to the several switches 300 of Fig. 18) and line 308 to amplifier A8 and switch S4. This operation thus transmits a pulse through the closed switch S4, causing the closing of switch S2 in the same manner as described above with respect to the actuation of one of the character keys (see Fig. 18). There is a position on the Character Drum (CD) corresponding to the word space, and similarly there is a position on the Character Space Pulse Generator (CSPG) with a predetermined number of pulses recorded thereon corresponding to the word space. In the embodiment described a single such pulse is so recorded, and without detailed tracing of the circuits, it will be evident that the system will thus provide for the recording on the Character Memory Cylinder a pulse indicating a word space, and for the recording on the Recording Space Register (RSR) of a single pulse for that word space at the proper angular position corresponding to the sequence of that space in the line.

Thus the recording operation continues throughout the entire line, resulting in the recording of circumferentially spaced pulses on the CMC corresponding to the selected characters with the pulses being spaced axially thereon corresponding to their position in the line, including a pulse recorded thereon for each word space. In addition there are recorded on the Recording Space Register (RSR) the number of pulses corresponding to the width of each character and in the sequence in which the characters appear in the line, together with a single additional pulse corresponding to each word space in the line.

Each time the word space bar is actuated, an auxiliary switch 375 (Fig. 20) is closed and the step-by-step Word Space Sequence Selector (WSSS) is advanced a step. Upon closing, a circuit is completed from a source of voltage 376 to a solenoid 377 which attracts its armature 378 and advances a ratchet mechanism 379 by one step. The mechanism carries a contact arm 380 which is advanced in a series of steps over contact 381. The pickup 340 on the KPG in the zero or datum line position for recording is connected to the first such contact and successive pickups around the KPG are sequentially connected to the remaining contacts. It will thus be evident that the switch arm 380 of the WSSS will be advanced one position for each word space in the line and that its position at the end of the line will correspond with the number of word spaces in the line.

When it is desired to restore the WSSS to its initial position a circuit is closed through solenoid 385 which upon actuation releases the ratchet wheel and it is returned to its initial position by suitable means such as a spring 386.

Printing cycle

After the typing of the line has been completed the operator can observe the typed copy and check it for accuracy, retyping the line without printing if an error has been made. If the typed line is correct, the operator presses the Print Key (PR) (Fig. 21), and the following sequence of operations then takes place.

When the pulse on the Key Pulse Generator (KPG) reaches a predetermined position, indicated as the bottom position in Fig. 21, which corresponds to the zero or datum line position for the printing operation, a circuit is completed from the pickup head 400 in that position, through line 401, amplifier A5 and line 402 through closed switch PR to line 403 which conveys a closing pulse to effect the closing of both switches S13 and S7.

Switch S13 upon closing establishes a circuit from the pickup of the Timing Pulse Generator (TPG) through amplifier A3 and line 317, through switch S13, and line 405 to recording head 406, recording on the Word Space Memory or WSM. As described above, the single pulse on the KPG is purposely made relatively broad and wide in the angular direction while the pulses on the TPG are relatively short and sharp. The result is that when the pulse on the KPG approaches the bottom or zero position it effects the closing of switches S13 and S7 as just described, slightly ahead of the time when the pulse on the TPG is picked up with the result that when the latter occurs, the switches have already been closed and thus such pulse is picked up and transfitted through the circuit described and recorded as a corresponding pulse on the WSM.

This operation continues with each successive pulse on the TPG being transferred through the circuit described and recorded on the WSM until the pulse on the KPG reaches the angular position shown in Fig. 21 where a pulse is induced in the particular pickup 410 to which connection has been made by the contact arm 380 of the Word Space Sequence Selector (WSSS). In Figs. 20 and 21 the WSSS is shown as occupying the fourth position, corresponding to four depressions of the word space bar, or four word spaces in the line. As the pulse on the KPG approaches the pickup connected to the fourth contact, and because of its broad angular character, it creates a pulse through the circuit including line 412, the selected switch contact 381 of the WSSS, line 413, amplifier A2 and line 414 to the opening input of switch S13. This takes place before the fifth such pulse on the TPG has been picked up, and therefore it results in the recording on the WSM of the four pulses corresponding to the presumed condition of four word spaces in the line.

Meanwhile, and immediately upon the closing of switch S7 which occurred when the pulse on the KPG reached the bottom position, a circuit has been completed from the pickup 420 conveniently located with respect to the Recording Space Register (RSR) on which the data has been progressively recorded corresponding to the width of each selected character in the line including a pulse corresponding to each word space in the line. These pulses are transmitted through line 421, amplifier A11, line 422 through closed switch S7 and line 424 to a recording head 430 located at a corresponding angular position to pickup 420 relative to another register designated as a Printing Space Register (PSR). It will be evident therefore that as the revolution of the system proceeds, all of the data recorded on the RSR will be re-recorded in the same relative position on the PSR.

Since this re-recording began when the pulse on the KPG was at its lowermost position it is necessary to stop the recording just before the system including the pulse completes one revolution. This is accomplished by the introduction of an auxiliary pickup head 435, referred to as the marker pickup, located between the bottom pickup 400 of the KPG and the pickup of the character angle immediately adjacent thereto, thereby allowing completion of a full revolution by providing for the generation of a pulse in this extra pickup head 435 just before the KPG pulse returns to its bottom or zero position. This pulse is transmitted through line 436, amplifier A6 and line 437 to effect the opening of switch S7, thereby terminating further pickup from the RSR and recording on the PSR.

The opening of switch S7 results in the transmission of a pulse through line 438 to the erasing head 439, described in Fig. 3 to thereby effect the erasing of all data recorded thereon after the data has been transferred to the PSR, and in preparation for the composition of a new line.

Referring now to Fig. 22, the pulse recorded on the Character Memory Cylinder (CMC) is picked up in the bottom or datum line position by the pickup head 440, goes through line 441 to amplifier A9, line 442 to switch S5 which is in the closed position. From S5 it goes through line 443 into gate G1. Since this pulse was recorded on the CMC by the pulse on the KPG it is relatively broad as illustrated in Fig. 6, and it is initiated slightly in advance of the precise or true character angle position of the rotating system. In order to obtain an accurate timing of the flash at an instant which will assure its correct position in the line, a pulse is picked up from the TPG when the next recorded pulse thereon passes the pickup head 315, and this pulse is transmitted through line 316, amplifier A3 and line 317 and supplied to the gate G1. G1 requires simultaneous pulses from both of its input circuits, and when such pulses either occur simultaneously or overlap, as is the present case, it conducts, and the short duration pulse is transmitted through line 445 to the flashing light control diagrammatically illustrated at 165 where the pulse causes the triggering of the flash with resultant projection through the character opposite that position, through the lens system 160 and onto the film 131 in film carriage 130. Thus the flash occurs at the precise instant that the recorded pulse on the CMC and the Character Drum (CD) occupy the true zero or datum line position for that character, that is at the exact character angle position of the system.

The same pulse through S5 closes S6 by means of line 455 and the next time the pulse on the KPG passes the bottom pickup position indicated by reference numeral 400 (when the Printing Sequence Selector (PSS) is in the first character position in the line) a pulse is transmitted through the movable contact 460 of the PSS, line 461, amplifier A10 and switch S6, line 462 to gate G4. It will be understood that as the printing of successive characters proceeds, the PSS will advance progressively step-by-step to its series of positions, and in each case the circuit just traced will be duplicated except through a different one of the pickup heads on the KPG corresponding to the location of that particular character in the line.

Gate G4 operates similarly to gate G1 in that the broad pulse from the KPG requires accurate timing by the sharp pulse picked up from the TPG and transmitted by pickup 315 and lines 316 and 317. When this sharp pulse coincides in G4 with the broad pulse, the gate becomes conducting and causes the transmission of a closing pulse through line 463 to a switch S8. Upon the closing of this switch, the previously recorded data on the Printing Space Register (PSR) is picked up at the bottom or datum line position by pickup 470, transmitted through line 471, amplifier A12, line 472, switch S8, line 473, buffer B2 and line 474 into the Printing Space Pulse Counter (PSPC). As described above the Printing Space Register (PSR) carries a series of pulses thereon for each character angle corresponding to the width of the several characters as selected for the line, including a definite predetermined number of pulses for each word space, the latter in the embodiment described being a single such pulse for the word space. Thus while the system rotates through the first character angle, the pickup 470 will pick up the number of pulses previously recorded in that angle corresponding to the first character in the line and these pulses will be added into the PSPC. When the next one of the timing pulses on the TPG passes its pickup 315, corresponding to the end of the first character angle, that pulse through the lines 316 and 317 causes the opening of switch S8 and thus discontinues further pick up from the PSR. When S8 opens it generates a pulse which travels through line 476 to effect the opening of both switches S5 and S6, and through line 478 to cause the stepping mechanism 480 to advance the position of the Printing Sequence Selector (PSS) contact 460 and the recording head 440 in the CMC to the next position corresponding to the second character in the line. Stepping Mechanism 480 is similar to that shown in Fig. 13 except that it has no connection for traversing the carriage.

Revolution of the system continues until the pulse on the KPG reaches the marker pickup 435 just ahead of the datum line position whereupon a pulse is transmitted through line 436, amplifier A6, line 485, through switch S9 which has been previously closed by the closing of switch S12, and line 486 to buffer B2. The circuit connections of the counter PSPC are such that when S8 is closed it adds all pulses which it receives, but when S8 is open, it subtracts all pulses which it receives, the only pulses which it can receive under these conditions being those received through S9. Hence this pulse from the marker pickup 435 subtracts the count of 1 from the PSPC. This operation continues with the system rotating for as many revolutions as there are recorded pulses on the PSR in that character angle. Meanwhile the film is being continuously advanced by direct geared connection with the rotating system shown in Fig. 15 and generally indicated at 490 in Fig. 22 and thus the larger the number of recorded pulses for the particular character, the greater the number of revolutions of the system that will be made, and consequently the wider space allotted on the film for that particular character. The selection and flashing of the next character in the line is therefore delayed or withheld until a sufficient amount of the continuously moving film has been advanced to provide proper space for the varying widths of the letters. When the PSPC reaches the count of zero it produces an opening pulse through line 492 which causes the closing of S5, and the cycle repeats for the second and thereafter for each subsequent character in the line.

It should be pointed out that at the beginning of the line the previously recorded pulses from the PSR are counted into the PSPC beginning when the reference pulse on the KPG is at the bottom datum line position. Thus this reference pulse will in many cases reach the bottom datum line position before the recorded pulse on the CMC is reached and hence before the light flashes. Hence counting of pulses into the PSPC will not occur until after the beginning of the second revolution of the system because the pulses cannot be transmitted until after the flash has occurred. However in the meantime the reference pulse on the KPG has passed the marker pickup 435 and since this circuit is completed through S9, it has resulted in the counting of a negative pulse into the PSPC. The PSPC is capable of handling the negative count and will generate a zero pulse only when a zero count follows a previous positive count. This insures that the printing will occur accurately, whatever may be the relative position of the character in the line.

It should be further noted that the recorded characters on the drum are displaced forwardly or backwardly in the direction of their travel a predetermined amount in order to compensate for the travel of the film carrier during that time the system is revolving from the datum line to the position of each character and thus whether they are flashed early during the revolution or toward the end thereof, the projected images always appear in the correct positions.

Word spacing and justification

The operation of the system will now be described with reference to the operations that take place upon the occurrence of a word space, i. e., a space between any two groups of characters, and in that connection the justifying operation will also be described.

It will be understood from the foregoing that a pulse has been recorded on the CMC for each word space, that pulse having been placed on the CMC in a predetermined angular position. See Fig. 23. In the embodiment described that position must correspond with the occurrence of the reference pulse on the KPG at its bottom or datum line position so that pulses are transmitted simultaneously through the pickup 400 in that position, line 401 to A5 and from line 402 to gate G2. Simultaneously the recorded character pulse in this datum line position on the CMC is picked up by pickup head 440 and transmitted through line 441, amplifier A9, line 442, switch S5 and line 443 to G2. This causes the gate G2 to produce an output pulse through line 505 which causes the closing of switches S10 and S11 and simultaneously the opening of switch S9. Upon the closing of switch S11 the pickup 470 of the PSR transmits pulses through line 471, amplifier A12, and line 507, through switch S11 and line 508 into buffer B3, line 110 to the Space Register Counter (SRC). During the ensuing revolution of the system all of the pulses recorded on the PSR, that is, the several pulses corresponding to the width of each character in the line as well as the predetermined number of pulses for each word space (such as 1), are counted and subtracted from the preset count on the SRC, this counter being arranged so that upon reaching a zero count it automatically sends out a pulse and returns to a predetermined maximum count corresponding to the maximum iota width of the line. Counter SRC may be arranged either to add or subtract as desired, and in view of its method of construction and operation as above described, it may be considered as performing either operation. For ease of understanding its operation will be hereafter described as if it were adding, and is being set for a predetermined maximum corresponding to the desired iota width of the line, the counter sending out a pulse when that maximum is reached and immediately resetting to zero.

At the same time the pickup 520 on the Word Space Memory Drum (WSM) picks up the pulses recorded on that drum corresponding to the number of word spaces, and these pulses are transmitted through line 521, amplifier A13, line 522, switch S10, line 523, buffer B3 and line 510 into the counter SRC. Since the pulses on the PSR were recorded from the Space Pulse Generator (SPG) which had a blank immediately opposite the timing pulses on the TPG, it will be obvious that none of the pulses recorded on the PSR are exactly in the same time relationship with those of the TPG pulses. On the other hand the pulses recorded on the WSM were recorded from TPG pulses and hence are out of phase with all of the PSR recorded pulses. Thus the two series of pulses never coincide but always take place in timed relation to each other and thus can be both supplied concurrently into the SRC during the same period. During the first revolution of the system following the occurrence of a word space pulse on the CMC, the SRC receives pulses from the PSR and from the WSM, both of which are added into the counter. At the end of the first revolution the reference pulse on the KPG acting through the marker or extra pickup 435 transmits a pulse through line 436, amplifier A6, line 485 to switch S11, thereby causing that switch to open and stop any further counting from the PSR into the SRC. The circuit through switch S10 however is not interrupted and thus the pickup from the WSM continues to count into the SRC, each revolution counting one pulse for each word space, and this operation thus continues with the film being advanced until the count on the SRC reaches the predetermined maximum for which it has been preset. At this time the SRC mechanism causes it to reset to a zero count, and in so doing it sends out a pulse through line 525 which causes the closing of switch S12. At the end of the revolution in which this occurs, the reference pulse on the KPG is picked up, through pickup 400, line 401, amplifier A5, line 402, through switch S12 and line 527 to cause the closing of switch S9 and the opening of switch S10, thereby restoring the circuit to the previous condition under which it will return to the printing of characters in the manner described above.

When a word space pulse appears on the CMC it causes the counting of a single pulse from the PSR into the PSPC in the same manner as described above in connection with the appearance of the individual characters on the CMC, but no subtraction operation occurs because the switch S9 is open. Not until switch S9 is closed again is the normal process of printing characters resumed. After one more revolution of the system the count on the PSPC returns to zero and the printing of characters is resumed.

The following illustrates the operation of the system in justifying a line of composition. Assume a line containing 8 words, thus having 7 word spaces and let this be represented by the letter W equals 7. Assume an average of 5 letters to the word and an average width of all letters of 6 iotas per letter. The total character with of all letters including one iota unit count for each word space is thus $8\times5\times6+7=247$ which may be designated C. Assume a line L having a total length of 347 iotas or L=347, and the SRC is accordingly adjusted to reset at a count of 347.

Thus L−C=100 iotas to be divided among the 7 word spaces, a condition having been assumed which was not evenly divisible. The justification is accomplished in the operation of the system as described above in the following manner.

At the end of the first word space the count of C=247 is placed into the SRC by the PSR and the count of 7 is added by the WSM. Therefore during the first revolution of the system after the word space pulse appears the count is 247+7=254. The system continues to rotate, adding the count of 7 from the WSM during each revolution, and this will therefore continue for 15 revolutions at which time the total count will be 352. Since this is in excess of the count of 347 for which the SRC has been set, there will be a remainder of 5, that is, the counter SRC retains an initial count of 5, counted after the reset, before the completion of the final revolution of the first word space and that count remains until the initiation of the second word space. Meanwhile the system has completed 15 revolutions and the film has been advanced continuously a distance corresponding to 15 iotas, the first word space thus being 15 iotas in length.

The following table shows the sequence of operations for each of the word spaces:

FIRST WORD SPACE

| Revolution (m) | Previous Remainder | C | nW | Total |
|---|---|---|---|---|
| 1st | 0 | 247 | 7 | 254 |
| 15th | 0 | 247 | 105 | 352 |

Length of first word space—15 iotas
Remainder (L−352)=5

SECOND WORD SPACE

| | | | | |
|---|---|---|---|---|
| 1st | 5 | 247 | 7 | 259 |
| 14th | 5 | 247 | 98 | 350 |

Length of second word space—14 iotas
Remainder (L−350)=3

THIRD WORD SPACE

| | | | | |
|---|---|---|---|---|
| 1st | 3 | 247 | 7 | 257 |
| 14th | 3 | 247 | 98 | 348 |

Length of third word space—14 iotas
Remainder (L−348)=1

FOURTH WORD SPACE

| | | | | |
|---|---|---|---|---|
| 1st | 1 | 247 | 7 | 251 |
| 15th | 1 | 247 | 105 | 353 |

Length of fourth word space—15 iotas
Remainder (L−353)=6

FIFTH WORD SPACE

| | | | | |
|---|---|---|---|---|
| 1st | 6 | 247 | 7 | 260 |
| 14th | 6 | 247 | 98 | 351 |

Length of fifth word space—14 iotas
Remainder (L−351)=4

SIXTH WORD SPACE

| | | | | |
|---|---|---|---|---|
| 1st | 4 | 247 | 7 | 258 |
| 14th | 4 | 247 | 98 | 349 |

Length of sixth word space—14 iotas
Remainder (L−349)=2

SEVENTH WORD SPACE

| | | | | |
|---|---|---|---|---|
| 1st | 2 | 247 | 7 | 256 |
| 14th | 2 | 247 | 98 | 347 |

Length of seventh word space—14 iotas
Remainder (L−347)=0

It will be found that the same process of justification occurs whatever the difference between the total available space in the line and the total width of the characters, and regardless of the number of word spaces, the system providing for forming word spaces which are either uniform or if there is an excess not evenly divisible, such excess is substantially evenly distributed among selected word spaces differing by only one unit from the rest over the entire line, as distinguished from having all the extra units in a series of word spaces at one or the other end of the line.

Upon the completion of the printing of the line as described above the several recording cylinders are erased by means of the erasing heads shown and described above, and the carriage is returned to its left-hand margin either manually or automatically in accordance with known mechanism. The system is then in condition for the typing and composing of another line of composition.

Non-standard spacing and kerning

In some cases it is desired to provide spaces of definite extent in the composition, as distinguished from word spaces, likewise kerning is desirable, and in accordance with the present invention controls are provided for producing spaces of predetermined width, and for preventing the standard or normal character spacing in response to the actuation of a kerning control, the operator then actuating a selected space key to provide a predetermined amount of space which may be less than the standard, to thereby accomplish kerning.

The circuit for these controls is shown in Fig. 24, including only so much of the previously described system fully shown in Figs. 18 and 19 as necessary to illustrate the operation of the circuits added thereto. In this figure the Kerning Key 529, the Key Pulse Generator (KPG), the Character Memory Cylinder (CMC) and the Character Space Pulse Generator (CSPG), are shown with a representative number of space keys 530, identified as Sp4, Sp5 and Sp6. Any desired number of such keys may be provided and they are intended to provide for spaces of definite amounts such as 4, 5, and 6 iotas, respectively. These keys are arranged upon the keyboard and actuate contactors 531 connecting line 308 to pickup heads 532 respectively, each of which occupies a predetermined character angle position around the KPG.

In corresponding angular positions upon the CSPG there are recorded a number of space pulses, indicated at 325, corresponding in number to the several widths desired, for example, 4, 5, and 6 pulses rsepectively.

A kerning key 529 is mounted in suitable position upon or adjacent the keyboard and is arranged to be depressed by the operator concurrently with the actuation of a character key when kerning of characters is desired. The character key A is shown, which actuates switch 300, connecting line 308 to KPG pickup 306.

With the kerning key 529 in the raised or unactuated position the system operates in the same manner as described above when any of the keys is actuated. Whenever the operator desires to insert into the line a space of fixed width, as distinct from a word space which is subject to adjustment in width as a result of the process of justification, he presses one of the space keys 530 corresponding to the width of the desired space. A pulse generated in one of the pickups 532 is thereby conducted through the corresponding contactor 531 and line 308 to A8 and S4. From S4 the pulse travels through line 310 and contact arm 533 which normally engages contact 534, connected to line 535, through which it travels to CMC recorder 320 and is recorded on the CMC in an angular position corresponding to the selected space and in an axial position corresponding to the selected order of its position in the line, as described above. The same pulse also travels from line 310 through contactor arm 537, normally engaged contact 538 and line 540 to the closing terminal of switch S2 thereby effecting the closing of S2. During the subsequent rotation of the system through the next character angle the appropriate number of space pulses recorded on the CSPG at 325 appears on pickup 330, is conducted through lines 331 and A4 through the closed switch S2 and B1 to be added to the count of RSPC, preparatory to being recorded on the RSR as above described, thereby providing for continuous rotation of the system for the predetermined number of revolutions desired to effect the advance of the film for the preselected number of spaces. Since no character appears on the Character Drum corresponding to the character angle positions of the various space keys 530, a space is thus provided which may be selected to have any desired width.

When the Kerning Key 529 is in the actuated, or depressed position, line 310 is disconnected from lines 535 and 540 and connected through arm 537 and contact 541, through line 544 to the contactor arm 542 which normally engages contact 543 connected to line 546 and CMC recorder 320. Contactor arm 542 is adapted to be actuated by the depressing of any one of the space keys 530 and when so actuated it opens the circuit through 543 and engages contact 545 through which it is connected to line 548 and the closing terminal of S2. Thus while Kerning Key 529 is actuated, line 310 is connected only to the CMC recorder 320, but if any of the space keys is actuated at the same time line 310 is connected only to the closing terminal of S2.

When kerning is to be practiced the operator depresses kerning key 529, and while holding it down he depresses the desired character key, for example the A key, closing contactor 300. A pulse appearing in pickup 306 is conducted through contactor 300, line 308, amplifier A8 and switch S4 to line 310. It then travels through arm 537, contact 541, line 544, arm 542, contact 543, line 546 to CMC recorder 320, by means of which a character pulse is recorded. Since no connection exists between line 310 and the closing terminal of S2 at this time the switch S2 does not close and the space pulses recorded on the CSPG in the appropriate character angle for the character A are not counted on the RSPC. As a result of this, the events described in connection with Figs. 18 and 19 by which the appropriate number of space pulses is recorded on the RSR to determine the spacing do not take place. While the kerning key 529 is still held down, the operator then presses the space key corresponding to the desired spacing of the character. The pulse which then appears in the pickup 532 passes through contactor 531, line 308, amplifier A8, switch S4, line 310, arm 537, line 544, arm 542, contactor 545 and line 548 to the closing terminal of S2 thereby effecting the closing of S2. While the system rotates through the subsequent character angle the space pulse recorded at 325 on the CSPG corresponding to the number of spaces indicated by the actuated space key 530 are picked up by pickup 330, conducted by line 331 to amplifier A4, and through the closed switch S2 and buffer B1 to be added to the count of the RSPC. The above mentioned events then take place as previously described to record on the appropriate sector of the RSR the non-standard number of space pulses associated with the space key 530 instead of that number associated with the character key previously actuated.

Thus it may be seen that the action of the kerning key 529 is such that while it is depressed the actuation of any character key results in the recording of a character pulse on the CMC but no space pulses on the RSR; and the actuation of any space key results in the recording of the selected number of space pulses on the RSR but no character pulse on the CMC. Thus kerning is accomplished by holding down the kerning key while successively depressing the character key for the desired character and the space key for the desired space.

It will be remembered that the step mechanism 365 (Fig. 19) whereby the typewriter carriage, the CMC recorder and the Recording Sequence Selector (RSS) are advanced after the recording of a character or word space, is actuated from the closing pulse of switch S1 which is the final event of the above mentioned sequence of events whereby the space pulses are recorded on the RSR. Therefore during kerning the typewriter carriage will not advance after the character key is depressed because these events are not initiated because switch S2 is not closed, but the carriage will advance after the space key is depressed. It will therefore be advantageous to provide a locking means whereby the kerning key remains in the depressed state after being actuated, and to provide additional means whereby the locking means may be unlocked as a result of the operation of stepping mechanism 365. This will simplify the operation of the machine since the operator will then be relieved of the necessity to hold down the kerning key while operating the character key and the space key in succession, and will be reminded to perform the second of these operations by the failure of the carriage to space following the first.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A photocomposing machine adapted to compose a line of composition on a record film including a character carrier having a plurality of characters thereon of different widths, a flash source of light, continuously rotating means for effecting continuous relative movement between said carrier and said light source, means for continuously advancing said film in direct relation with the rotation of said means and in increments which are small in relation to the individual character widths, means for selecting a series of characters, means controlled in accordance with the character selected for controlling said instant of the flashing of said light within a single revolution of said *continuously rotating means* [character carrier] to effect the flashing of the selected character upon said film, means for sensing the width of the selected characters, and means controlled in accordance with said width sensing means for causing said rotating means to rotate a predetermined whole number of revolutions to advance said film proportionately in accordance with the width of the selected character to effect the proper number of increments of film advance to accomplish the spacing of the character in the line.

2. A photocomposing machine adapted to compose a line of composition on a film including a character carrier having a plurality of characters thereon of different width, means for selecting said characters in sequence, a flash source of light, rotating means for producing continuous relative rotation of said carrier with respect to said light source, means for continuously advancing said film in direct relation with the rotation of said means, and in increments which are small in relation to the individual character widths, means controlled in accordance with the character selected for determining the fractional part of a revolution of said character carrier *relative to said light source* in which the flash occurs to effect the flashing of the selected character, means responsive to the width of each selected character, and means also controlled in accordance with said width responsive means for determining the whole number of revolutions of said rotating means before the flashing of the succeeding character to effect the film advance in accordance with the width of each selected character.

3. A photocomposing machine adapted to compose a line of composition on a film including a character carrier having a plurality of characters thereon of different width, means for selecting a sequence of said characters, a flash source of light, rotating means for producing continuous relative rotation of said carrier with respect to said light source, means for continuously advancing said film in direct relation with the rotation of said means, and in increments which are small in relation to the individual character widths, means controlled in accordance with the character selected for effecting the flashing of said light source at the proper instant in a revolution of said character carrier *relative to said light source* to flash an image of said selected character upon said film, means responsive to the width of each selected character, and means controlled in accordance with said width responsive means for withholding the time of flashing of the next selected character in the sequence until after a predetermined number of revolutions of said rotating means providing for correlated advance of said film an amount corresponding to the width of the selected character.

4. A photocomposing machine adapted to compose a line of composition on a film including a character carrier having a plurality of characters thereon of different widths, means for selecting a sequence of said characters, a flash source of light, means for effecting continuous relative rotation between said light source and said carrier forming a continuously rotating system, means for continuously advancing said film in direct relation with the rotation of said system and in increments which are small in relation to the individual character widths, means controlled in accordance with the selection of a character for controlling the instant within a revolution of said system at which the light is flashed to produce an image of the selected character upon the film, means for sensing the width of each selected character, means controlled by said sensing means for continuing the rotation of said system for a predetermined whole number of revolutions following the flashing of each said character to effect advance of the film by an amount proportional to the width of that character, and means for thereafter restoring the system to the operation of said flashing control to effect the proper timing of the flash within the next subsequent revolution of the system in accordance with the next selected character.

5. A photocomposing machine adapted to compose a line of composition on a film including a character carrier having a plurality of characters thereon of different widths, means for selecting a sequence of said characters, a flash source of light, means for effecting continuous relative rotation between said light source and said carrier forming a continuously rotating system, means for continuously advancing said film in direct relation with the rotation of said system and in increments which are small in relation to the individual character widths, means controlled in accordance with the character selected for controlling the instant within a revolution of said system at which the light is flashed to produce an image of the selected character upon the film, a register, means controlled in response to the selection of each character for recording data in said register indicative of the width of each said character, and means controlled by said register for continuing the rotation of said system for a predetermined whole number of revolutions following the flashing of each said character to effect advance of the film by an amount proportional to the width of that character, and means for thereafter restoring the system to the operation of said flashing control to effect the proper timing of the flash within the next subsequent revolution of the system in accordance with the next selected character.

6. A photocomposing machine adapted to compose a line of composition on a film including a character carrier having a plurality of characters thereon of different widths, means for selecting a sequence of said characters, a flash source of light, a continuously rotating system for effecting continuous relative movement between said carrier and said light source, means for continuously advancing the film in direct relation with the rotation of said system and in increments which are small in relation to the individual character widths, register means for storing data indicative of the sequence of the selected characters and of the width of each such character, means controlled by said register means for timing the flashing of said source during the continuous rotation of said system at the instant when said carrier is in the proper angular position *relative to said light source* to flash an image of the selected character upon the film, and means also controlled by said register means for effecting a predetermined number of revolutions of said system between the flashing of successive characters to allow the film to advance continuously an amount proportional to the width of each selected character.

7. A machine as defined in claim 6 in which separate registers are provided for storing the data indicative of the selected character and the data indicative of the width of such selected character.

8. A photocomposing machine for producing photographically a line of composition on a film comprising a rotatable character carrier having a plurality of characters thereon forming a continuously rotating system, means for selecting a sequence of said characters to form a line of composition, means for continuously advancing the film in a direction generally tangent to the rotation of said carrier in direct relation with the rotation of said system and in increments which are small in relation to the individual character widths, a flash source of light, means controlled in accordance with the selection of a character for timing the flashing of said light during continuous revolution of said system to effect projection of the desired character on the film, said characters on said carrier being displaced in progressively varying amount relative to said timing means in the direction of rotation thereof by varying amounts in accordance with the angular position of each said character on said carrier to produce projected images thereof in accurately located positions on said film.

9. Photocomposing mechanism for producing photographically a justified line of composition on a film which includes means for selecting a sequence of characters of different units of individual width arranged in the form of words with spaces therebetween to form a line of composition of a predetermined total width, means for counting the width in units of all the characters in said line, means for counting the number of word spaces in the line, means for repeating the count of said number of word spaces successively until the total thereof with said character width count equals the total available width in the line, means for advancing said film to form spaces between words, means controlled by the number of repetitions of said word space count to operate said film advancing means in proportion to said number of repetitions to thereby determine the extent of the space between words, and means for repeating said operations upon the occurrence of each word space in the line.

10. A photocomposing machine for producing photographically a justified line of composition on a film comprising a character carrier having a plurality of characters thereon of different unit width, means for selecting a sequence of said characters to form words and word spaces in a line of composition of predetermined total width, *a rotating count generator,* means for continuously advancing said film in direct relation with the rotation of said *count generator* [system] and in increments which are small in relation to the individual character widths, means operable upon the occurrence of each word space for counting the total space in units occupied by all the characters in the line, means for counting the total number of word spaces, and means for repeating the count of said number of word spaces once during each revolution of said *count generator* [system] while said film continues to advance a predetermined amount for each revolution until the total count with said character width count reaches the total of the spaces available in the line to effect spaces on said film between words.

11. A photocomposing machine for producing photographically a justified line of composition on a film comprising a rotatable character carrier having a plurality of characters thereon of different unit widths, means for selecting said characters to form a line of composition of predetermined total width, *a rotating count generator,* means for continuously advancing the film in predetermined fixed relation to the rotation of said *count generator* [system] and in increments which are small in relation to the individual character widths, means for counting the space in units occupied by each of said characters, means operable within a single such revolution at the proper instant for projecting an image of the selected character onto said film, means controlled by said space counting means for continuing said system in rotation for a predetermined whole number of revolutions to advance the film by an amount to space the characters in the line, means for counting the total spaces occupied by all the characters in the line, means for counting the total number of word spaces in the line, and means for repeating the count of said number of word spaces once during each revolution of said [system] *count generator* while said film continues to advance until the total count reaches the total of the space available in the line to form word spaces in the line.

12. A photocomposing machine adapted to compose a justified line of composition on a film comprising a rotatable character carrier on which characters of different unit width are arranged for individual projection, a flash source of light, continuously rotating means for effecting continuous relative movement between said carrier and said light source, means forming part of said rotating means for continuously advancing said film in predetermined fixed relation with the rotation of said means, and in increments which are small in relation to the individual character widths, means for selecting characters to form a line of composition of predetermined total width, means controlled by the selection of a character for controlling the instant of flashing of said light to select the desired character for projection, means operable upon the occurrence of a word space in the line for counting the total space in units occupied by all the characters in the line, means for also counting the total number of word spaces, and means for repeating the count of said number of word spaces once during each revolution of said rotating means while said film continues to advance until the total count reaches the total of the space available in the line, and means for thereafter returning to the selection of characters.

13. A photocomposing machine adapted to compose a justified line of composition on a film comprising a rotatable character carrier on which characters of different unit width are arranged for individual projection, a flash source of light, continuously rotating means for effecting continuous relative movement between said carrier and said light source, means forming part of said rotating means for continuously advancing said film in predetermined fixed relation with the rotation of said means, and in increments which are small in relation to the individual character widths, means for selecting characters to form a line of composition of predetermined total width, means controlled by the selection of a character for controlling the instant of flashing of said light to select the desired character for projection, means operable upon the occurrence of a word space in the line for counting the total space in units occupied by all the characters in the line, means for also counting the total number of word spaces, and means for repeating the count of said number of word spaces once during each revolution of said rotating means while said film continues to advance until the total count reaches the total of the space available in the line, means for thereafter returning to the selection of characters, and means for repeating the entire counting operation upon the occurrence of each word space in the line.

14. A photocomposing machine adapted to compose a line of composition on a film which comprises a character carrier having a plurality of characters thereon of different width adapted to occupy different units of space in the line, means for selecting said characters to compose said line, a flash source of light, continuously rotating means for effecting continuous relative movement between said carrier and said light source, means forming part of said rotating means for continuously advancing said film in predetermined fixed relation with the rotation of said means, and in increments which are small in relation to the individual character widths, means controlled in accordance with the selection of the character for controlling the instant of the flashing of said light within a single revolution to effect the flashing of the selected character upon said film, means also controlled in accordance with the selection of a character for causing said rotating means to rotate a predetermined whole number of revolutions in accordance with the width of a selected character, means for counting the total number of space units occupied by all the characters in the line, means for counting the total number of word spaces in the line, means operable upon the occurrence of a word space in the line for repeatedly counting the number of word spaces in the line during each revolution of said rotating means while said film continues to advance until the total with the total of said word space units equals the maximum available width of the line, and means for thereafter returning to the flashing of the next character in the line.

15. A photocomposing system for producing photographically a justified line of composition on a film comprising a character recorder for recording data corresponding to the total width in units of all the characters in the line plus a predetermined number of units for each word space, a word space recorder for separately recording a predetermined number of units corresponding to the number of word spaces in the line, a counter, means for initially counting the number of units on said character recorder and the number of units on said word space recorder into said counter, means for repeating the counting of the number of units from said word space recorder only and adding said count into said counter and for simultaneously advancing said film a predetermined amount each time said count is repeated, means actuated upon said counter reaching a predetermined value corresponding to the total available width in the line for initiating the projection of a succeeding character in the line, and means for repeating said operations upon the occurrence of each word space.

16. In a photocomposing machine adapted to produce a line of composition photographically on a film the combination of means for selecting characters of different width to form a line of composition, a rotatable character carrier on which the individual characters are arranged for individual projection, a magnetic member rotatably associated with said carrier and having separate groups of pulses recorded thereon corresponding in number to the width of each character, sensing means cooperating with said magnetic member for sensing the pulses in said groups corresponding to selected characters, a counter controlled by said sensing means for counting the number of pulses in each said separate group corresponding to the selected characters, means for recording the number of pulses corresponding to the character widths of the selected characters, means controlled by said counter for supplying pulses to said recording means corresponding to the number of pulses in each selected group, means for advancing said film, and means controlled by the number of pulses in said recording means for regulating the amount of said film advance for each character in proportion thereto.

17. In a photocomposing machine the combination of means for selecting characters of different width in sequence to form a line of composition, a rotating system including a memory drum for recording a pulse in sequence and in a predetermined position corresponding to each selected character, a register for recording pulses corresponding in number to the widths of the selected characters, a film, means for continuously moving said film in correlated relation with the rotation of said system, a character carrier rotating with said system, a light source arranged to be flashed to project an image of a selected character onto said film, means operable in accordance with the character selected for controlling the flashing of said light source at a predetermined instant within a revolution of said system to select the desired character, means continuing the revolution of said system and the continuous advance of said film for a number of revolutions corresponding to the number of pulses recorded on said register for each selected character, and means operable in response to completion of said predetermined number of revolutions for initiating the printing of a subsequent character.

18. A photocomposing machine for producing photographically a justified line of composition on a film comprising *a rotating system including* a rotatable character carrier on which characters of different width are arranged for individual projection, means for selecting a sequence of characters to form a line of composition, means for continuously advancing the film in predetermined fixed relation with the rotation of said system, means for producing a plurality of pulses corresponding in number to the width of each character, means for controlling the number of revolutions of said system and the corresponding advance of said film in proportion to the number of pulses for each selected character, means for producing a plurality of pulses corresponding to the number of word spaces in the line, a counter, means operable upon the occurrence of a word space for counting into said counter the total number of character width pulses for the entire line, means operable for repeatedly counting into said counter the number of pulses corresponding to the number of word spaces in the line until the count in the counter corresponds to the maximum available width of the line while said film continues to advance.

19. A photocomposing machine for producing photographically a justified line of composition on a film comprising a rotatable character carrier on which characters of different width are arranged for individual projection, means for selecting a sequence of characters to form a line of composition, means for continuously advancing the film in predetermined fixed relation with the rotation of said system, means for producing a plurality of pulses corresponding in number to the width of each selected character, means for controlling the number of revolutions of said system and the corresponding advance of said film in proportion to the number of pulses for each selected character, means for producing a plurality of pulses corresponding to the number of word spaces in the line, a counter, means operable upon the occurrence of a word space for counting into said counter the total number of character width pulses for the entire line, means operable for repeatedly counting into said counter the number of pulses corresponding to the number of word spaces in the line until the count in the counter corresponds to the maximum available width of the line while said film continues to advance, and means for repeating the same counting operations upon the occurrence of each word space.

20. In a photocomposing machine adapted to produce a line of composition photographically the combination of a keyboard for selecting characters of different width for projection on said film to form a line of composition, a rotatable character carrier on which the characters are arranged for individual projection, a magnetic member rotatable with said carrier and having separate groups of pulses recorded thereon corresponding in number to the width of each character, a counter for counting the number of pulses in each said separate group, means operable in response to actuation of a selected key on said keyboard for counting on said counter the number of pulses in the selected group corresponding to the selected character, a second source of timing pulses, a register for recording the number of pulses corresponding to the width of each said selected character, and means controlled by said counter for applying the number of pulses from said second source to said register corresponding to the number of pulses in the selected group for each such character.

21. A photocomposing machine in accordance with claim 20 in which the keyboard has a word space bar, and means for recording on said register a predetermined number of pulses in respond to each actuation of said word space bar.

22. In a photocomposing machine having a keyboard and adapted to compose a line of characters photographically, the combination of means for selecting characters of different widths to form a line of composition including word spaces, means for determining the widths of the individual selected characters, a first register for recording data corresponding to the widths of all the characters in the line as the characters are selected, separate means for recording the number of word spaces in the composed line, a second register, a control actuable to initiate the printing cycle, and means operable in response to actuation of said control for transferring the recorded data on said first register to said second register and clearing said first register in prepration for receiving data during the composition of the succeeding line.

23. In a photocomposing machine having a keyboard and adapted to compose a line of characters photographically, the combination of means for selecting characters of different widths to form a line of composition including word spaces, means for determining the widths of the individual selected characters, a first register for recording data corresponding to the widths of all the characters in the line as the characters are selected, separate means for recording the number of word spaces in the composed line, a second register, a control actuable to initiate the printing cycle, means operable in response to actuation of said control for transferring the recorded data on said first register to said second register and clearing said first register in preparation for receiving data during the composition of the succeeding line, and means for simultaneously recording on said separate recording means the number of word spaces in the composed line.

24. A photocomposing machine for producing a line of composition on a film which comprises means for selecting characters of different widths in sequence to form the line, means for flashing selected characters successively on said film to form said line of composition, a counter, means for counting into said counter the width of each selected character in units, a continuously rotating system including means for continuously advancing said film to provide spacing between successive characters, means controlled by the count in said counter for timing the intervals between successive flashings of characters to establish a normal spacing of said characters on said film, and a control for substituting a non-standard count in said counter to effect a non-standard space between characters.

25. A photocomposing system for producing a line of composition on a film and for accomplishing kerning which comprises a keyboard having character keys, spacing keys, and a kerning key, a counter, means operable upon actuation of each of said character keys for counting into said counter the width of the selected character, means operable normally for advancing said film in direct proportion to the count in said counter to establish a normal character spacing, means operable in response to actuation of said kerning key for disabling said counter, and means operable upon actuation of one of said space keys for establishing a count in said counter corresponding to the selected space key to control the advance of said film in direct proportion to the spaces so selected.

26. A photocomposing machine adapted to form a line of composition on a film comprising a character carrier having a plurality of characters thereon arranged for projection onto said film, means for moving said carrier in a continuous path to bring said characters successively into projecting position with respect to said film, a flash source of light for effecting the flashing of a selected one of said characters to project an image thereof onto said film while said carrier is in continuous movement, means for selecting a sequence of characters to form said line of composition, a recording drum, means connecting said drum directly with said carrier for continuous movement therewith, means controlled by said selecting means for recording data on said drum in a predetermined angular position corresponding to the angular position of the selected characters on said carrier, and means controlled by said recorded data for effecting the flashing of said light source at the proper instant to project an image of the corresponding character onto said film.

27. A photocomposing machine adapted to form a line of composition on a film comprising a character carrier having a plurality of characters thereon in different angular positions arranged for projection onto said film, means for continuously rotating said carrier to bring said characters successively into projecting position with respect to said film, a flash source of light for effecting the flashing of one of said characters to project an image thereof onto said film while said carrier is in continuous rotation, means for selecting a sequence of characters to form said line of composition, a recording drum, means connecting said drum with said character carrier for continuous rotation therewith, means controlled by said selecting means for recording data on said drum in the form of magnetic pulses for the respective characters in predetermined angular positions corresponding to the angular position of the selected characters on said carrier, and means controlled by said magnetic pulses for effecting the flashing of said light source at the instant when said carrier is in the proper angular position to project an image of the selected character onto said film.

28. In a photocomposing machine adapted to produce a line of composition on a film, the combination of a continuously rotatable character carrier on which individual characters are arranged in different angular positions, a first pulse generator having a fixed angular relation to said character carrier and having a plurality of output circuits arranged in corresponding angular relation to the angular arrangement of said characters on said character carrier, a first pulse recorder, means for selectively energizing such output circuits to record pulses on said first recorder corresponding to the selected characters of a line of composition, a second pulse generator adapted to generate a plurality of groups of pulses, each group corresponding to one of said characters and comprising a number of pulses related to the width of that character, a second pulse recorder, a flash source of light adapted to be actuated intermittently, said source being optically related to said character carrier and to said film for projecting on said film the images of said characters, means controlled by said first recorder for effecting the flashing of said light source to project images of the selected characters onto said film, means for advancing said film between the projection of successive characters, and means controlled by said second recorder for controlling said film advancing means to effect an advance corresponding with the width of each said character.

29. In a photocomposing machine adapted to produce line of composition on a film, the combination of a continuously rotatable character carrier on which individual characters are arranged in different angular positions, a first pulse generator having a fixed angular relation to said character carrier and having a plurality of output circuits arranged in corresponding angular relation to the angular arrangement of said characters on said character carrier, a first pulse recorder, means for selectively energizing such output circuits to record pulses on said first recorder corresponding to the selected characters of a line of composition, a second pulse generator adapted to generate a plurality of groups of pulses, each group corresponding to one of said characters and comprising a number of pulses related to the width of that character, a second pulse recorder, selecting means for selecting the groups of pulses corresponding to the selected characters, counting means for counting the pulses in said selected group, a third pulse generator for generating pulses, switch means controlled by said counter for connecting said third pulse generator to said second pulse recorder for recording thereon a number of pulses corresponding to the number comprising said selected group, a flash source of light adapted to be actuated intermittently, said source being optically related to said character carrier and to said film for projecting on said film the images of said characters, means controlled by said first recorder for effecting the flashing of said light source to project images of the selected characters onto said film, means for advancing said film between the projection of successive characters, and means controlled by said second recorder for controlling said film advancing means to effect an advance corresponding with the width of each said character.

30. In a photocomposing machine adapted to produce a line of composition on a film, the combination of a continuously [rotatably] *rotatable* character carrier on which individual characters are arranged in different angular positions, a pulse generator having a fixed angular relation to said character carrier and having a plurality of output circuits arranged in corresponding angular relation to the angular arrangement of said characters on said character carrier, a first pulse recorder, means for selectively energizing such output circuits to record pulses on said first recorder corresponding to the selected characters of a line of composition, a second pulse generator adapted to generate a plurality of groups of pulses, each group corresponding to one of said characters and comprising a number of pulses related to the width of that character, a second pulse recorder, selecting means for selecting the groups of pulses corresponding to the selected characters, counting means for counting the pulses in said selected group, a flash source of light adapted to be actuated intermittently, said source being optically related to said character carrier and to said film for projecting on said film the images of said characters, a film holder adapted to carry said film and to move relative to said character carrier an amount having a fixed relation to the rotation of said character carrier, means controlled by the angular position of the pulses on said first recorder for flashing said source of light in relation to the angular position of said character carrier for projecting onto said film the images of each of the selected characters of said line of composition, and means controlled by the number of pulses on said second recorder for controlling the movement of said film for producing the desired spacing between said images.

31. A photocomposing machine adapted to compose a justified line of composition on a film comprising a rotatable character carrier on which characters of different width are arranged for projection, a high speed flash source of light for illuminating selected characters while the disk is rotating, a pattern of permanently recorded pulses rotatable with said character carrier and associated with individual characters with the arrangement of the pulses in the pattern indicating the different widths of the characters, a pulse recording device for memorizing and recording the pattern and arrangement of the characters and spaces in a line of composition, means for continuously moving a photographic film in direct relation with the rotation of said character carrier to advance said film through a small increment during each revolution of the character carrier, and means controlled by said pulse recording device for timing the flashing of said light source to project images of the selected characters onto said film, and means also controlled by a said pulse recording device for continuing the rotation of said character carrier through a predetermined number of revolutions between the flashing of successive characters as determined by said recorded pattern and arrangements of pulses to produce the correct spacing of the characters on said film.

32. A photocomposing machine adapted to compose a justified line of composition on a film comprising a rotatable character carrier on which characters of different width are arranged for projection, a high speed flash source of light for illuminating selected characters while the disk is rotating, a pattern of permanently recorded pulses rotatable with said character carrier and associated with individual characters with the arrangement of the pulses in the pattern indicating the different widths of the characters, a pulse recording device for memorizing and recording the pattern and arrangement of the characters and spaces in a line of composition, computing means controlled by said pulse recording device for computing word spaces to justify the line of composition, means for continuously moving a photographic film in direct relation with the rotation of said character carrier to advance said film through a small increment during each revolution of the character carrier, and means controlled by said pulse recording device for continuing the rotation of said character carrier through a predetermined number of revolutions between the flashing of successive characters as determined by said recorded pattern and arrangements of pulses to produce the correct spacing of the characters on said film.

33. A photocomposing machine as defined in claim 4, including means for forming spaces between groups of said characters by effecting continued rotation of said system for a plurality of complete revolutions between the flashing of successive characters.

34. A photocomposing machine as defined in claim 4, including means for forming word spaces by continuing the rotation of said system at the end of a word for a larger number of complete revolutions before the flashing of the first character of the next word in the line.

35. A photocomposing machine for producing photographically a line of composition on a film comprising a rotatable character carrier having a plurality of characters thereon of different width and arranged for individual projection, said character carrier having coded data thereon associated with the respective characters and indicative of the widths of the individual characters, means for selecting a sequence of said characters, a flash source of light for illuminating selected characters, means operable in accordance with the operation of said selecting means for flashing said light source to illuminate said characters in sequence to cause projection of images thereof on said film, means for advancing said film, means operable during the rotation of said character carrier for sensing said coded data on said carrier and producing a count corresponding in number to the width of each selected character, and means controlled by said count for determining the advance of said film in proportion to the count for each selected character to thereby effect the spacing of the selected characters.

36. A photocomposing machine for producing a line of composition on a film comprising a rotatable character carrier having a plurality of characters thereon of different width and arranged for individual projection, said character carrier having coded data thereon associated with the respective characters and indicative of the width of the individual characters, means for selecting a sequence of said characters for said line of composition, a flash source of light for illuminating selected characters, means operable in accordance with the operation of said selecting means for causing the flashing of said light source to illuminate said characters in sequence to cause projection of images thereof on said film, means for advancing said film, means operable in accordance with the operation of said selecting means for sensing said coded width data on said carrier for each selected character and recording said data, and means controlled by said recorded width data for controlling said film advancing means to advance said film by an amount corresponding to the width of each character to thereby effect the spacing of the characters in the line of composition.

37. A photocomposing machine adapted to form a line of composition on a film comprising a character carrier having a plurality of characters thereon in different angular positions arranged for projection onto said film, means for continuously rotating said carrier to bring said characters successively into projecting position with respect to said film, a flash source of light for effecting the flashing of one of said characters to project an image thereof onto said film while said carrier is in continuous rotation, a typewriter having character keys and a carriage, a recording drum, a recording head, means for causing said head to move axially of said drum in relation to the advance of said carriage to record on said drum in the same sequence as the sequence of the selected characters in said line of composition, means controlled by the operation of said keys for actuating said recording head to record data on said drum identifying the selected characters in said sequence, and means controlled by said recorded data for effecting the flashing of said light source at the instant when said carrier is in the proper angular position to project an image of the selected characters in sequence onto said film.

*38. A photocomposing machine adapted to compose a line of composition on a light-sensitive film comprising means for selecting a sequence of characters to form a line of composition, means actuated in accordance with the character selected for sensing the width of each selected character, a character matrix having a plurality of characters thereon of different widths, a flash source of light for illuminating instantaneously a selected character of said matrix, means controlled in accordance with the characters selected to trigger said light source to cause the projection of optical images of successive selected characters, a light sensitive film onto which said images are projected, means for continuously advancing said film relative to said images linearly in the direction of said line of composition at a uniform rate for said successive characters, and means controlled by said width sensing means for varying the time intervals between successive operations of said triggering means while said advancing means continues to advance with corresponding selection of the spacing of said images in accordance with the widths of the selected characters.*

*39. A photocomposing machine adapted to compose a line of composition on a light-sensitive film comprising means for selecting a sequence of characters to form a line of composition, means actuated in accordance with the character selected for sensing the width of each selected character, a character matrix having a plurality of characters thereon of different widths, a flash source of light for illuminating instantaneously a selected character of said matrix, means controlled in accordance with the characters selected to trigger said light source to cause the projection of optical images of successive selected characters, a light-sensitive film onto which said images are projected, means for advancing said film relative to said images linearly in the direction of said line of composition at a uniform rate for said successive characters, and means controlled by said width sensing means for predetermining the length of time of operation of said advancing means between projections of successive characters in relation to the width of each selected character to establish a predetermined amount of said advance movement for each such character.*

*40. A photocomposing machine adapted to compose a line of composition on a film comprising means for selecting a sequence of characters to form a line of composition, a character matrix having a plurality of characters thereon of different widths measured in terms of a count of a predetermined number of units of width for each such character, a pulse counter, means actuated in accordance with the character selected for sensing the width of said selected character and for counting into said counter a number of pulses corresponding to the number of units of width of said selected character, a flash source of light for illuminating instantaneously a character of said matrix, means controlled in accordance with the character selected for triggering said light source to cause the projection of an optical image of the selected character, a light-sensitive film on which said image is projected, means for continuously advancing said film relative to said image linearly in the direction of said line of composition on said film, means for introducing pulses into said counter at a rate in predetermined relation to the rate of advance of said film, and means controlled by the number of pulses in said counter for predetermining the length of time of operation of said advancing means following the operation of said light source to effect a relative advance of said film with respect to said image in relation to the count in said counter for each selected character.*

*41. A photocomposing machine adapted to compose a line of composition on a film comprising means for selecting a sequence of characters to form a line of composition, a character matrix having a plurality of characters thereon of different widths measured in terms of a count of a predetermined number of units of width for each such character, a counter adapted to be preset to a predetermined condition, means actuated in accordance with the character selected for sensing the width of said selected character and for counting into said counter a number corresponding to the number of units of width of said selected character, a flash source of light for illuminating instantaneously a character of said matrix, means controlled in accordance with the character selected for triggering said light source to cause the projection of an optical image of said selected character, a light sensitive film on which said image is projected, means for advancing said film relative to said image linearly in the direction of said line of composition at a uniform rate, means for introducing pulses into said counter at a rate in predetermined relation to the rate of advance of said film, means controlled by said counter for transmitting an impulse to said triggering means when a predetermined count in said counter has been reached, and presetting means for setting said counter to a value equal to the difference between the said predetermined count and the number of units of width of a selected character whereby said means controlled by said counter will transmit a trigger impulse to said flash source of light when said film has advanced by a distance equal to the width of said character.*

References Cited in the file of this patent or the original patent

UNITED STATES PATENTS

| | | |
|---|---|---|
| 1,647,408 | Hunter | Nov. 1, 1927 |
| 1,732,049 | Hunter | Oct. 15, 1929 |
| 1,748,186 | Nyquist | Feb. 25, 1930 |
| 1,768,453 | Kell | June 24, 1930 |
| 1,821,466 | Grass | Sept. 1, 1931 |
| 2,019,764 | Ogden | Nov. 5, 1935 |
| 2,052,844 | Prusso et al. | Sept. 1, 1936 |
| 2,251,998 | Goodale | Aug. 12, 1941 |
| 2,257,763 | Petterson | Oct. 7, 1941 |
| 2,337,553 | Hofgaard | Dec. 28, 1943 |
| 2,408,754 | Bush | Oct. 8, 1946 |
| 2,412,252 | Contner | Dec. 10, 1946 |
| 2,682,814 | Higonnet | July 6, 1954 |
| 2,786,400 | Peery | Mar. 26, 1957 |